(12) United States Patent
Yamaguchi et al.

(10) Patent No.: US 6,594,595 B2
(45) Date of Patent: Jul. 15, 2003

(54) APPARATUS FOR AND METHOD OF MEASURING CROSS-CORRELATION COEFFICIENT BETWEEN SIGNALS

(75) Inventors: Takahiro Yamaguchi, Tokyo (JP); Masahiro Ishida, Tokyo (JP); Mani Soma, 12043 11th Ave. NW., Seattle, WA (US) 98177-4611

(73) Assignees: Advantest Corporation, Tokyo (JP); Mani Soma, Seattle, WA (US)

( * ) Notice: Subject to any disclaimer, the term of this patent is extended or adjusted under 35 U.S.C. 154(b) by 113 days.

(21) Appl. No.: 09/826,295

(22) Filed: Apr. 3, 2001

(65) Prior Publication Data

US 2003/0018442 A1 Jan. 23, 2003

(51) Int. Cl.$^7$ .............................................. G01R 13/00
(52) U.S. Cl. ............................ 702/69; 324/606; 708/5; 708/422
(58) Field of Search ............................ 702/69; 324/606, 324/617; 708/5, 422; 73/861.06; 327/3

(56) References Cited

U.S. PATENT DOCUMENTS

| | | | | |
|---|---|---|---|---|
| 4,856,895 A | * | 8/1989 | Parker | 250/239 |
| 5,625,150 A | * | 4/1997 | Greene et al. | 376/249 |
| 6,252,692 B1 | * | 6/2001 | Roberts | 359/110 |
| 6,304,515 B1 | * | 10/2001 | Spiesberger | 342/378 |
| 6,327,274 B1 | * | 12/2001 | Ravikanth | 370/516 |
| 6,356,850 B1 | * | 3/2002 | Wilstrup et al. | 702/106 |

* cited by examiner

*Primary Examiner*—John Barlow
*Assistant Examiner*—Anthony T. Dougherty
(74) *Attorney, Agent, or Firm*—David N. Lathrop, Esq.; Gallagher & Lathrop

(57) ABSTRACT

Timing jitter sequences $\Delta\phi^j[n]$ and $\Delta\phi^k[n]$ of respective clock signals under measurement $x_j(t)$ and $x_k(t)$ are obtained, and a covariance $\sigma_{tj,tk}=(1/N)\Sigma_{i=1}^{N}\Delta\phi^j[i]\cdot\Delta\phi^k[i]$ is obtained. In addition, root-mean-square values $\sigma_{tj}$ and $\sigma_{tk}$ of the respective $\Delta\phi^j[n]$ and $\Delta\phi^k[n]$ are obtained, and a cross-correlation coefficient $\rho=\sigma_{tj,tk}/(\sigma_{tj}\cdot\sigma_{tk})$ between the $x_j(t)$ and $x_k(t)$ is calculated.

19 Claims, 18 Drawing Sheets

FIG.11
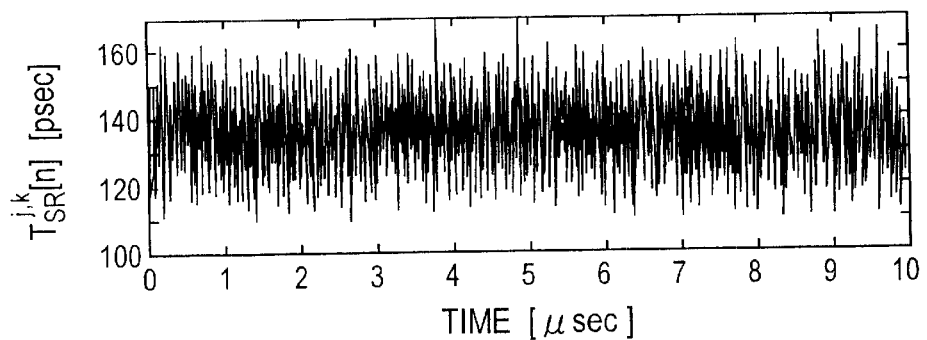
FIG.12
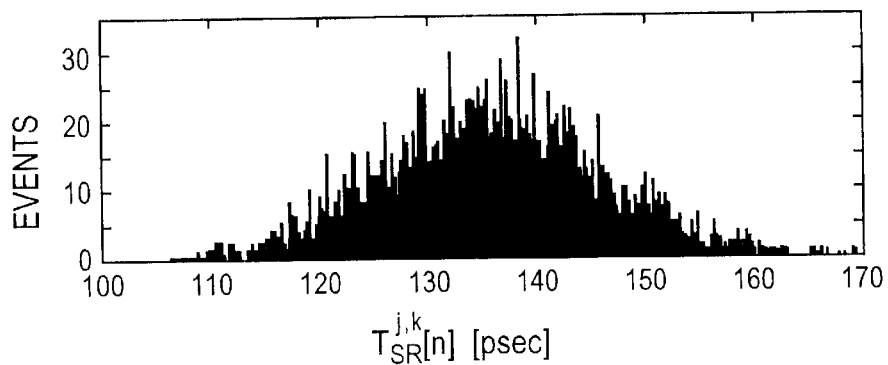
FIG.13
| OPERATING MODE | RMS JITTER [ps] | | CLOCK SKEW [ps] | | | |
|---|---|---|---|---|---|---|
| | $\sigma_{tj}$ | $\sigma_{tk}$ | RANDOM | | $|\tau_{Skew}^{j,k}|$ | $\rho$ |
| | | | $T_{SR}^{PP}$ | $\sigma_{Skew}$ | | |
| QUIET | 70.9 | 70.9 | 40.8 | 5.14 | 52.8 | 0.9973 (0.9974) |
| NOISY | 50.2 | 50.5 | 60.3 | 9.56 | 136 | 0.9821 (0.9820) |

US 6,594,595 B2

APPARATUS FOR AND METHOD OF MEASURING CROSS-CORRELATION COEFFICIENT BETWEEN SIGNALS

BACKGROUND OF THE INVENTION

The present invention relates to a cross-correlation coefficient measurement apparatus and a cross-correlation coefficient measurement method for measuring a cross-correlation coefficient between a plurality of signals each being a repetitive signal like, for example, a clock signal.

For example, if a cross-correlation coefficient ρ between a plurality of clock signals in a semiconductor integrated circuit can be measured, how much room of improvement is left to a performance limit (ρ=1) of the semiconductor integrated circuit, or how much the semiconductor integrated circuit is degraded from the performance limit can quantitatively be determined. Moreover, a signal-to-noise ratio between the plurality of clock signals can be estimated from the cross-correlation coefficient ρ. Measuring only a clock skew cannot provide these solutions.

Conventionally, an estimation of a cross-correlation coefficient between two clock signals has indirectly been performed by measuring a clock skew between these clock signals, and by judging magnitude of an RMS value (root-mean-square value) of the clock skew.

A clock skew has statistically been estimated using a time interval analyzer or a frequency counter. That is, as shown in FIG. 1, for example, when a reference clock signal $CLK_g$ from a clock signal source 11 is distributed and delivered to each of the registers 12j and 12k, each of the clocks under measurement $CLK_j$ and $CLK_k$ in the respective registers 12j and 12k is inputted to a time interval analyzer 13, where a timing difference between zero-crossing points of the clock signal under measurement $CLK_j$ and zero-crossing points of the clock signal under measurement $CLK_k$ is measured, and a fluctuation of the timing difference is measured by a histogram analysis as a clock skew. An example of clock skew measurement using a time interval analyzer 13 is described in, for example, "Jitter Analysis Clock Solutions", Wavecrest Corp., 1998.

However, an apparatus for or a method of directly measuring a cross-correlation coefficient between clock signals has not been known yet.

It is an object of the present invention to provide an apparatus and its method that can measure a cross-correlation coefficient between clock signals under measurement.

It is another object of the present invention to provide an apparatus and its method that can estimate not only a cross-correlation coefficient ρ between clock signals having the same frequency, but also a cross-correlation coefficient ρ between clock signals each having a different frequency from one another.

SUMMARY OF THE INVENTION

According to a first aspect of the present invention, an apparatus of the present invention comprises: timing jitter estimators for estimating respective timing jitter sequences of a plurality of signals under measurement; and a cross-correlation coefficient estimator to which the plurality of timing jitter sequences are inputted for calculating a cross-correlation coefficient between the signals under measurement.

According to a second aspect of the present invention, the apparatus of the present invention comprises: timing jitter estimators for estimating respective timing jitter sequences of the plurality of signals under measurement; a skew estimator to which the plurality of timing jitter sequences are inputted for calculating a timing difference sequence between those timing jitter sequences to output a skew sequence between signals; and a cross-correlation coefficient estimation means to which the plurality of timing jitter sequences and the skew sequence between signals are inputted for calculating a cross-correlation coefficient between the signals under measurement.

The principle of the present invention will be explained. In this explanation, a clock signal in a microprocessor is used as a clock signal under measurement.

Clock Skew Measurement Method

First, a clock skew will be defined. As shown in FIG. 2, a clock skew is given by the difference between delay times $\tau_{cd}^j$ and $\tau_{cd}^k$ of the clock signals $CLK_j$ and $CLK_k$ to arrive at the respective registers 12j and 12k when the clock signals $CLK_j$ and $CLK_k$ are derived from a reference clock signal $CLK_g$ of a clock signal source 11 as a reference time point of, for example, a clock distribution network. That is, the timing difference is given by an equation (1).

$$T_{Skew}^{j,k}(nT) = \tau_{cd}^k(nT) - \tau_{cd}^j(nT) \tag{1}$$

FIG. 3 shows by dotted lines an ideal reference clock signal $CLK_g$ having a fundamental period T, and ideal clock signals $CLK_j$ and $CLK_k$. Also shown in FIG. 3 are a difference $\tau_{cd}^j(nT)$ between an actual rising edge of the reference clock $CLK_g$ and an actual rising edge of the clock signal $CLK_j$, a difference $\tau_{cd}^k(nT)$ between the rising edge of the reference clock $CLK_g$ and a rising edge of the clock signal $CLK_k$ (n=0, 1, 2, . . . ), and the difference between the $\tau_{cd}^j(nT)$ and $\tau_{cd}^k(nT)$, i.e., a clock skew $T_{skew}^{j,k}(nT)$.

As shown in FIG. 4, it is assumed that rising edges of the clock signals $CLK_g$, $CLK_j$ and $CLK_k$ occur at time $t_{cd}^g(nT)$, $t_{cd}^j(nT)$ and $t_{cd}^k(nT)$ respectively, and ideal clock edges (clock edge time points when those clock signals do not have their respective jitters) of the clock signals $CLK_g$, $CLK_j$, and $CLK_k$ rise at time $(nT)_g$, $(nT)_j$ and $(nT)_k$ respectively. Then delay time $\tau_{cd}^j(nT)$ or $\tau_{cd}^k(nT)$ between the clock depature of the clock signal $CLK_j$ or $CLK_k$ and the arrival at the respective registers 12j or 12k is expressed by the following equation.

$$\begin{aligned}\tau_{cd}^j(nT) &= t_{cd}^j(nT) - t_{cd}^g(nT) \\ &= [t_{cd}^j(nT) - (nT)_j] - [t_{cd}^g(nT) - (nT)_g] + \{(nT)_j - (nT)_g\} \\ &= \tau_{Skew}^{g,j} + \left[\Delta\phi^j[n]\left(\frac{T_j}{2\pi}\right) - \Delta\phi^g[n]\left(\frac{T_k}{2\pi}\right)\right] \text{ [sec]}\end{aligned} \tag{2}$$

$$\begin{aligned}\tau_{cd}^k(nT) &= t_{cd}^k(nT) - t_{cd}^g(nT) \\ &= [t_{cd}^k(nT) - (nT)_k] - [t_{cd}^g(nT) - (nT)_g] + \{(nT)_k - (nT)_g\} \\ &= \tau_{Skew}^{g,k} + \left[\Delta\phi^k[n]\left(\frac{T_k}{2\pi}\right) - \Delta\phi^g[n]\left(\frac{T_g}{2\pi}\right)\right] \text{ [sec]}\end{aligned} \tag{3}$$

In this case, $$\tau_{Skew}^{g,j} = (nT)_j - (nT)_g \text{ [sec]} \tag{4}$$

and $$\tau_{Skew}^{g,k} = (nT)_k - (nT)_g \text{ [sec]} \tag{5}$$

are the time difference between an ideal clock edge of the clock signal $CLK_j$ and an ideal clock edge of the reference clock signal $CLK_g$, and the time difference between an ideal clock edge of the clock signal $CLK_k$ and an ideal clock edge of the reference clock signal $CLK_g$, respectively, and those time differences correspond to deterministic components of clock skew (deterministic clock skew values) that are determined by the respective clock signal paths. In addition, $\Delta\phi^g[n](T_g/2\pi)(=t_{cd}^g(nT)-(nT)_g)$, $\Delta\phi^j[n](T_j/2\pi)(=t_{cd}^j(nT)-(nT)_j)$ and $\Delta\phi^k[n](T_k/2\pi)(=t_{cd}^k(nT)-(nT)_k)$ express timing jitter sequences (each unit is second) of the clock signals $CLK_g$, $CLK_j$ and $CLK_k$, respectively. When the equations (2) and (3) are substituted in the equation (1), a clock skew $T_{Skew}^{j,k}$ between the clock signal $CLK_j$ and the clock signal $CLK_k$ is expressed by the following equation.

$$T_{Skew}^{j,k}[n] = \left\{\tau_{Skew}^{g,k} + \left[\Delta\phi^k[n]\left(\frac{T_k}{2\pi}\right) - \Delta\phi^g[n]\left(\frac{T_g}{2\pi}\right)\right]\right\} - \left\{\tau_{Skew}^{g,j} + \left[\Delta\phi^j[n]\left(\frac{T_j}{2\pi}\right) - \Delta\phi^g[n]\left(\frac{T_g}{2\pi}\right)\right]\right\} \text{ [sec]} \quad (6)$$

$$= \tau_{Skew}^{j,k} + \left[\Delta\phi^k[n]\left(\frac{T_k}{2\pi}\right) - \Delta\phi^j[n]\left(\frac{T_j}{2\pi}\right)\right]$$

The second term $$\left[\Delta\phi^k[n]\left(\frac{T_k}{2\pi}\right) - \Delta\phi^j[n]\left(\frac{T_j}{2\pi}\right)\right] = T_{SR}^{j,k}[n]$$

of the equation (6) corresponds to a random dispersion (random components) of clock skew caused by timing jitter of each clock signal. In this case, it is assumed that the fundamental period of the distributed clock signal $CLK_j$ is generally equal to the fundamental period of the distributed clock signal $CLK_k$ ($T_j=T_k$). In addition, $$\tau_{Skew}^{j,k}=(nT)_k-(nT)_j\text{[sec]} \quad (7)$$

is a difference between a rising edge time point of an ideal clock of the clock signal $CLK_j$ and a rising edge time point of an ideal clock of the clock signal $CLK_k$, and this $\tau_{Skew}^{j,k}$ is a deterministic component of clock skew determined by the paths of clock distribution network.

A measurement of a cross-correlation coefficient between signals under measurement according to the present invention corresponds to a random dispersion of clock skew. Therefore, a deterministic component of clock skew will not be discussed hereinafter.

In the method of measuring a cross-correlation coefficient between signals according to the present invention, respective timing jitters $\Delta\phi^j[n]$ and $\Delta\phi^k[n]$ of, for example, two clock signals under measurement $x_j(t)$ and $x_k(t)$ shown in FIG. 5 are obtained. The estimated timing jitter sequences $\Delta\phi^j[n]$ and $\Delta\phi^k[n]$ are as shown in FIGS. 6A and 6B, respectively. By calculating differences between the timing jitters $\Delta\phi^j[n]$ and $\Delta\phi^k[n]$, timing differences between clock edges are calculated to obtain random components $T_{SR}^{j,k}[n]$ of clock skew between the clock signals under measurement $x_j(t)$ and $x_k(t)$. FIG. 7 shows the resultant clock skew sequence $T_{SR}^{j,k}[n]$. A root-mean-square (RMS) value $\sigma_{Skew}$ of clock skew is obtained from the clock skew sequence $$\sigma_{Skew} = \sqrt{\frac{1}{N}\sum_{n=1}^{N}(T_{SR}^{j,k}[n])^2} \text{ [sec]} \quad (8)$$

Here, N is the number of samples of the measured clock skew data. FIG. 8 shows a probability density function of measured clock skew $T_{SR}^{j,k}[n]$.

Now, in a clock distribution network shown in FIG. 9, a system clock signal $CLK_G$ from an external system clock source 14 is inputted to a clock signal source 11 comprised of a PLL (Phase Locked Loop) circuit, where its frequency is multiplied by M. A clock signal $CLK_g$ whose frequency is M multiple of that of the $CLK_G$ is distributed as the clock signals $CLK_j$ and $CLK_k$ to a network, for example, the registers 12j and 12k. FIG. 10a shows the system clock signal $CLK_G$, FIG. 10b shows an ideal clock signal that is created by multiplying the frequency of the $CLK_G$ by M (in the case of FIG. 10, M=2), and FIG. 10c shows the distributed clock signal $CLK_j$ that is created by multiplying the frequency of the $CLK_G$. In FIG. 10a, $\Delta\Theta[1]$ [rad] of the system clock signal $CLK_G$ represents a timing fluctuation of its edge from an ideal clock edge (dashed lines). Therefore, the clock shown in FIG. 10b, that is created by multiplying the frequency of the system clock signal $CLK_G$ shown in FIG. 10a by M, is a clock of a case in which the system clock signal $CLK_G$ is multiplied by 2 in the case of illustrated example. Therefore, the number of clock edges is doubled in the case of FIG. 10b. In this case, it is sufficient for a newly increased rising edge of a clock to copy the jitter $\Delta\Theta[1]$ of a rising edge of the original system clock. In the case where the frequency is multiplied by M, one to one relationship of $\Delta\Theta[\{n/M\}]$ and $\Delta\phi^j[n]$ can be obtained when the $\Delta\Theta[1]$ is assigned (M−1) times. In this case, $\{x\}$ represents the maximum integer that does not exceed x. When a clock skew between the clock signals $CLK_j$ and $CLK_G$ is obtained using the equation (6), an equation (9) is obtained.

$$T_{Skew}^{G,j}[n] = \tau_{Skew}^{G,j} + \left[\Delta\phi^j[n]\left(\frac{T_j}{2\pi}\right) - \Delta\Theta\left[\left\{\frac{n}{M}\right\}\right]\left(\frac{T_G}{2\pi}\right)\right] \text{ [sec]} \quad (9)$$

Consequently, a cross-correlation coefficient between clock signals can be calculated using an equation (11) or (15) that is to be explained later.

The method of measuring a cross-correlation coefficient between signals according to the present invention can be applied, as described above, not only to an estimation of a cross-correlation coefficient between distributed clock signals of a microprocessor unit, but also to an estimation of a cross-correlation coefficient of rising zero-crossing points or falling zero-crossing points between other repetitive signals like sine wave signals.

Cross-correction Coeficient Estimation Method
Direct Method

A procedure for calculating a cross-correlation coefficient $\rho$ between clock signals from timing jitter sequences $\Delta\phi^j[n]$ and $\Delta\phi^k[n]$ will be made clear. In general, a cross-correlation coefficient $\rho$ is given by the following equation.

$$\rho = \sigma_{tj,tk}/(\sigma_{tj}\sigma_{tk}) \quad (10)$$

This relationship is described in, for example, "Engineering Applications of Correlation and Spectral Analysis" by J. S. Bendat and A. G. Piersol, John Wiley & Sons, Inc., 1976. Here, $\sigma_{tj,tk}$ is a covariance between $\Delta\phi^j[n]$ and $\Delta\phi^k[n]$, and is defined by the following equations.

$$\sigma_{tj,tk} = \frac{1}{N}\sum_{i=1}^{N}(\Delta\phi^j[i] - \langle\Delta\phi^j\rangle)(\Delta\phi^k[i] - \langle\Delta\phi^k\rangle) \quad (11)$$

-continued $$\langle \Delta\phi^j \rangle = \frac{1}{N} \sum_{i=1}^{N} \Delta\phi^j[i] \quad (12)$$

In addition, $\sigma_{tj}$ is a standard deviation of $\Delta\phi^j[n]$, and given by the following equation.

$$\sigma_{tj} = \sqrt{\frac{1}{N} \sum_{i=1}^{N} (\Delta\phi^j[i] - \langle \Delta\phi^j \rangle)^2} \quad (13)$$

Therefore, if $\Delta\phi^j[n]$ and $\Delta\phi^k[n]$ can be estimated, a cross-correlation coefficient $\rho$ between clock signals can be calculated using the equations (10)–(13). Incidentally, since each mean value $\langle \Delta\phi^j \rangle$, $\langle \Delta\phi^k \rangle$ of timing jitter is zero, a mean value estimated using the equation (12) may be treated as zero. That is, each of the $\langle \Delta\phi^j \rangle$ and $\langle \Delta\phi^k \rangle$ in the equations (11) and (12) may be assumed to be zero to calculate, as shown in the following equations (11)' and (13)', a covariance $\sigma_{tj,tk}$ and a standard deviation $\sigma_{tj}$. In this case, the $\sigma_{tj}$ is equivalent to a calculation of a root-mean-square value (RMS value) of $\Delta\phi^j[i]$.

$$\sigma_{tj,tk} = \frac{1}{N} \sum_{i=1}^{N} \Delta\phi^j[i] \cdot \Delta\phi^k[i] \quad (11)'$$

$$\sigma_{tj} = \sqrt{\frac{\sum_{i=1}^{N} \Delta\phi^j[i]^2}{N}} \quad (13)'$$

Cross-correlation Coefficient Estimation Method:
Indirect Method

A procedure for calculating a cross-correlation coefficient $\rho$ between clock signals from RMS values of timing jitter sequences $\Delta\phi^j[n]$ and $\Delta\phi^k[n]$ and an RMS value of clock skew $T_{SR}^{j,k}[n]$ will be made clear. A variance $\sigma^2_{Skew}$ of clock skew $T_{SR}^{j,k}[n]$ can be obtained by calculating a mean square value of difference between the $\Delta\phi^j[n]$ and $\Delta\phi^k[n]$ using the following equation.

$$\sigma^2_{Skew} = E\{|\Delta\phi^k[n] - \Delta\phi^j[n]|^2\}$$
$$= \sigma^2_{tj} + \sigma^2_{tk} - 2\rho\sigma_{tj}\sigma_{tk}$$

From this equation, a cross-correlation coefficient $\rho$ between timing edges (for example, rising edges) of respective clock signals $x_j(t)$ and $x_k(t)$ is given by the following equation.

$$\rho = \frac{\sigma^2_{tj} + \sigma^2_{tk} - \sigma^2_{Skew}}{2\sigma_{tj}\sigma_{tk}} \quad (14)$$

Therefore, if RMS values $\sigma_{tj}$ and $\sigma_{tk}$ of the respective $\Delta\phi^j[n]$ and $\Delta\phi^k[n]$ and an RMS value $\sigma_{Skew}$ of the clock skew $T_{SR}^{j,k}$ can be estimated, a cross-correlation coefficient $\rho$ between the clock signals $x_j(t)$ and $x_k(t)$ can be calculated using the equation (14).

Signal to Noise Ratio Estimation Method

A variance $\sigma_{j,kL}^2$ of timing jitter $\Delta\phi^k[n]$ that is linear contributions of timing jitter $\Delta\phi^j[n]$ alone can be expressed by the following equation.

$$\sigma_{j,kL}^2 = \rho^2 \sigma_{tk}^2 \quad (15)$$

A variance $\sigma^2_{tK,NL}$ of timing jitter $\Delta\phi^k[n]$ that fluctuates due to all other effects including non-linear relationship with a fluctuation of timing jitter $\Delta\phi^j[n]$ and noise can be expressed by the following equation.

$$\sigma_{j,kNL}^2 = (1-\rho^2)\sigma_{tk}^2 \quad (16)$$

From the equations (15) and (16), a ratio of the fluctuation of the timing jitter $\Delta\phi^k[n]$ by a linear fluctuation (signal components) of the $\Delta\phi^j[n]$ to the fluctuation (noise) of the $\Delta\phi^k[n]$ not related to the fluctuation of the $\Delta\phi^j[n]$, i.e., a signal-to-noise ratio between timing edges of the respective clock signals $x_j(t)$ and $x_k(t)$ can be obtained using a cross-correlation coefficient $\rho$, as shown by an equation (17), from the equations (15) and (16).

$$SNR = \frac{\sigma^2_{j,kL}}{\sigma^2_{j,kNL}} = \frac{\rho^2}{1-\rho^2} \quad (17)$$

Effect of the Cross-correlation Coefficient Estimation

An effect of the cross-correlation coefficient estimation will be shown below using specific examples. In a "quiet" mode in which only an on-chip PLL of an MPU operates, a clock skew sequence $T_{SR}^{j,k}[n]$ between clock signals $x_j(t)$ and $x_k(t)$ and its probability density function are as shown in FIGS. 7 and 8, respectively. In this case, since noise is small, it is presumed that the cross-correlation coefficient takes a value close to 1. On the other hand, in a "noisy" mode in which all on-chip circuits and input/output circuits of the MPU perform their toggle operations, a clock skew sequence $T_{SR}^{j,k}[n]$ between the clock signals $x_j(t)$ and $x_k(t)$ and its probability density function are as shown in FIGS. 11 and 12, respectively. In a quiet mode, it is presumed that the cross-correlation coefficient $\rho$ takes a value close to 1 since noise is small, and in a noisy mode, it is presumed that the cross-correlation coefficient $\rho$ takes a value less than 1 since noise is large.

FIG. 13 shows cross-correlation coefficients $\rho$ estimated using the method of measuring cross-correlation coefficient between clock signals according to the present invention. A value 0.9973 in quiet mode is cross-correlation coefficient obtained using the equation (10). A value 0.9974 shown in parentheses is obtained using the equation (14). It is understood that an approximately same value can be estimated by either of the methods. In this case, if a signal-to-noise ratio is obtained using the equation (17), the value is 37 dB.

On the other hand, in a "noisy" mode, the cross-correlation coefficient $\rho$ takes a smaller value 0.9821. If a signal-to-noise ratio is obtained using the equation (17), the value is 29 dB. Therefore, it can be quantitatively grasped that the signal-to-noise ratio in "noisy" mode is smaller than that in "quiet" mode by 8 dB. Further, $T_{SR}^{PP}$ in FIG. 13 represents a peak-to-peak value of random components of the skew between the clocks $CLK_j$ and $CLK_k$, and $|\tau_{Skew}^{j,k}|$ represents a deterministic component based on the paths in the skew between the clocks $CLK_j$, and $CLK_k$.

An estimation of a cross-correlation coefficient and an estimation of an S/N ratio between clock signals described above can also be applied to an estimation of a cross-correlation coefficient and an estimation of an S/N ratio between zero-crossing timings of repetitive signals like sine waves whose frequencies are substantially in a relationship of integer M-multiple (M≧1). That is, the present invention is also applied to signals other than clock signals.

Timing Jitter Estimation Method

Next, a timing jitter estimation method used in the method of estimating a cross-correlation coefficient between signals according to the present invention will be described below. The description below can also be applied to signals other than clock signals. However in this case, an explanation will be given using clock signals as a matter of convenience. Further, the following description is described in a thesis proposed by the inventors of the present invention, entitled "Extraction of Peak-to-Peak and RMS Sinusoidal Jitter Using an Analytic Signal Method" by T. J. Yamaguchi, M. Soma, M. Ishida, T. Watanabe, and T. Ohmi, Proceedings of 18th IEEE VLSI Test Symposium, pp. 395–402, 2000 and in the international publication WO00/46606 (published on Aug. 10, 2000) report.

A jitter-free clock signal is a square wave having a fundamental frequency $f_0$. This signal can be decomposed by Fourier analysis to harmonics having frequencies $f_0$, $3f_0$, $5f_0$, .... Since a jitter corresponds to a fluctuation of a fundamental frequency of a clock signal under measurement, only signal components around the fundamental frequency are handled in the jitter analysis.

A fundamental sinusoidal wave component of a jittery clock signal (clock signal under measurement) can be expressed, assuming that its amplitude is A and its fundamental period is $T_0$, by the following equation.

$$x(t) = A\cos(\phi(t)) = A\cos\left(\frac{2\pi}{T_0}t + \phi_0 - \Delta\phi(t)\right) \tag{18}$$

Here, $\phi(t)$ is an instantaneous phase of the clock signal under measurement, and can be expressed by a sum of a linear instantaneous phase component $2\pi t/T_0$ containing the fundamental period $T_0$, an initial phase angle $\phi_0$ (can be made zero in the calculation), and an instantaneous phase noise component $\Delta\phi(t)$.

When the instantaneous phase noise component $\Delta\phi(t)$ is zero, an interval between rising zero-crossing points of the clock signal under measurement is a constant period $T_0$. The $\Delta\phi(t)$ that is not zero fluctuates the zero-crossing points of the clock signal under measurement. That is, a $\Delta\phi(nT_0)$ at a zero-crossing point $nT_0$ represents a time fluctuation of a zero-crossing point, and is called a timing jitter. Therefore, by estimating an instantaneous phase $\phi(t)$ of the clock signal under measurement, and by obtaining a difference between an instantaneous phase $\phi(t)$ and a linear phase (corresponds to a phase waveform of a jitter-free ideal clock signal) $2\pi t/T_0+\phi_0$, i.e., an instantaneous phase noise $\Delta\phi(t)$ at a zero-crossing point, timing jitter of the clock signal under measurement can be obtained.

In the timing jitter estimation method used in the present invention, for example, a clock signal under measurement $x(t)$ is transformed into a complex analytic signal $z(t)$ at first, and an instantaneous phase $\phi(t)$ of the clock signal under measurement $x(t)$ is estimated from the analytic signal $z(t)$. A linear line fitting by least squares method is applied to the estimated instantaneous phase waveform data to obtain a linear instantaneous phase $\phi_{linear}(t)$ corresponding to an instantaneous phase waveform of a jitter-free ideal signal. Then a difference between the instantaneous phase $\phi(t)$ and the linear instantaneous phase $\phi_{linear}(t)$ is calculated to obtain an instantaneous phase noise $\Delta\phi(t)$ of the clock signal under measurement. The instantaneous phase noise $\Delta\phi(t)$ is sampled at a timing (approximated zero-crossing point) closest to each zero-crossing point of a real part $x(t)$ of the analytic signal $z(t)$ to estimate an instantaneous phase noise at a zero-crossing timing $nT_0$, i.e., a timing jitter $\Delta\phi[n](=\Delta\phi(nT_0))$. In this manner, an instantaneous phase noise is obtained to estimate a timing jitter $\Delta\phi[n]$.

In this timing jitter estimation method, a timing jitter can be estimated with high accuracy by removing, using waveform clipping means, amplitude modulation (AM) components of the clock signal under measurement in the state that phase modulation components corresponding to jitter of the clock signal under measurement are retained in the clock signal under measurement. In addition, it is desirable to remove low frequency components of the instantaneous phase noise using low frequency component removing means.

Instantaneous Phase Estimation Method Using Analytic Signal

An analytic signal $z(t)$ of a clock signal under measurement $x(t)$ is defined by a complex signal expressed by the following equation (19).

$$z(t) \equiv x(t) + j\hat{x}(t) \tag{19}$$

In this case, j represents an imaginary unit, and an imaginary part $\hat{x}(t)$ of the complex signal $z(t)$ is a Hilbert transform of a real part $x(t)$.

On the other hand, Hilbert transform of a time waveform $x(t)$ is defined by the following equation (20).

$$\hat{x}(t) = H[x(t)] = \frac{1}{\pi}\int_{-\infty}^{+\infty}\frac{x(\tau)}{t-\tau}d\tau \tag{20}$$

In this case, $\hat{x}(t)$ is a convolution of the function $x(t)$ and $(1/\pi f)$. That is, Hilbert transform is equivalent to an output at a time when the $x(t)$ is passed through a all pass filter. However, the output $\hat{x}(t)$ in this case has not been changed in terms of its spectrum components, but its phase has been shifted by $\pi/2$.

Analytic signal and Hilbert transform are described in, for example, "Probability, Random Variables, and Stochastic Processes" by A. Papoulis, 2nd edition, McGraw-Hill Book Company, 1984.

An instantaneous phase waveform $\phi(t)$ of a clock signal under measurement $x(t)$ can be obtained from an analytic signal $z(t)$ using the following equation (21).

$$\phi(t) = \tan^{-1}\left[\frac{\hat{x}(t)}{x(t)}\right] \tag{21}$$

Next, an algorithm for estimating an instantaneous phase using Hilbert transform will be described. First, Hilbert transform is applied to a clock signal under measurement $x(t)$.

$$x(t) = A\cos\left(\frac{2\pi}{T_0}t + \phi_0 - \Delta\phi(t)\right) \tag{22}$$

Then a signal x̂(t) corresponding to an imaginary part of an analytic signal z(t) is obtained as follows.

$$\hat{x}(t) = H[x(t)] = A\sin\left(\frac{2\pi}{T_0}t + \phi_0 - \Delta\phi(t)\right) \quad (23)$$

Then the clock signal under measurement x(t) is transformed into an analytic signal z(t) as follows.

$$z(t) = \quad (24)$$
$$x(t) + j\hat{x}(t) = A\cos\left(\frac{2\pi}{T_0}t + \phi_0 - \Delta\phi(t)\right) + jA\sin\left(\frac{2\pi}{T_0}t + \phi_0 - \Delta\phi(t)\right)$$

Here, a band-pass filtering process has been applied to the obtained analytic signal. This is because a jitter corresponds to a fluctuation of a fundamental frequency of a clock signal under measurement and hence only signal components around the fundamental frequency of the clock signal under measurement are processed in a jitter analysis. Next, a phase function φ(t) is estimated from the obtained analytic signal z(t) using the equation (21).

$$\phi(t) = \left[\frac{2\pi}{T_0}t + \phi_0 - \Delta\phi(t)\right]\bmod 2\pi \text{ [rad]} \quad (25)$$

Here, the φ(t) is expressed using principal values of phase in the range of −π to +π, and has a discontinuity point at the proximity of a point where the phase changes from +π to −π. Finally, by unwrapping (that is, integer multiples of 2π are appropriately added to principal values φ(t)) the discontinuous phase function φ(t), a continuous instantaneous phase φ(t) from which discontinuity has been removed can be obtained.

$$\phi(t) = \frac{2\pi}{T_0}t + \phi_0 - \Delta\phi(t) \text{ [rad]} \quad (26)$$

A phase unwrapping method is described in "The Cepstrum: A Guide to Processing" by Donald G. Childers, David P. Skinner, and Robert C. Kemerait, Proceedings of IEEE, vol. 65, pp. 1482–1442, 1977.

Transformation to Analytic Signal Using Fast Fourier Transform

A transformation from a clock signal under measurement to an analytic signal can be realized by a digital signal processing using a transformation of a signal in time domain into a signal in frequency domain like Fast Fourier Transformation (FFT).

First, FFT is applied to a digitized clock signal under measurement x(t) shown in FIG. 14 to obtain a both-sided spectrum (having positive and negative frequencies) X(f) of the clock signal under measurement. FIG. 15A shows the obtained both-sided spectrum X(f). Next, as shown in FIG. 15B, only data around the fundamental frequency in the positive frequency components of the spectrum X(f) are retained, and the remaining data are replaced by zeros. In addition, the positive frequency components are doubled. These processes in frequency domain correspond to limiting bandwidth of the clock signal under measurement and transforming the clock signal under measurement into an analytic signal Z(f) in time domain. Finally, by applying inverse FFT to the band-limited signal Z(f), a band-limited analytic signal z(t) can be obtained.

Transformation to an analytic signal using FFT is described in, for example, "Random Data: Analysis and Measurement Procedure" by J. S. Bendat and A. G. Piersol, 2nd edition, John Wiley & Sons, Inc., 1986.

In addition, when an estimation of instantaneous phase is the object of the process, the process of doubling the positive frequency components can be omitted.

Approximated Zero-crossing Point Detection Method

Next, an approximated zero-crossing point detection method will be described. First of all, the maximum value of a real part x(t) of an analytic signal of the inputted clock signal under measurement is defined as 100% level, and the minimum value is defined as 0% level to calculate 50% level signal value $V_{50\%}$ as a zero crossing level. A difference between a sample value and the 50% level $V_{50\%}$ and a difference between its adjacent sample value and the 50% level $V_{50\%}$ of the x(t), i.e., (x(j−1)−$V_{50\%}$) and (x(j)−$V_{50\%}$) are calculated, and furthermore a product of those difference values (x(j−1)−$V_{50\%}$)×(x(j)−$V_{50\%}$) is calculated. When the x(t) crosses 50% level, i.e., zero-crossing level, the sign of its sample value (x(j−1)−$V_{50\%}$) or (x(j)−$V_{50\%}$) changes from a negative sign to a positive sign or from a positive sign to a negative sign. Therefore, when the product is negative, it is detected that the x(t) has passed the zero-crossing level, and a time point J−1 or j, at which a smaller absolute value of the sample value (x(j−1)−$V_{50\%}$) or (x(j)−$V_{50\%}$) is detected, is obtained as an approximated zero crossing point.

Waveform Clipping

Waveform clipping means removes AM components from an input signal and retains only PM components in the input signal. A waveform clipping is performed by: 1) multiplying an analog or digital input signal by a constant, 2) replacing a signal value greater than a predetermined threshold value Th1 with the threshold value Th1, and 3) replacing a signal value less than a predetermined threshold value Th2 with the threshold value Th2. Here, it is assumed that the threshold value Th1 is greater than the threshold value Th2.

BRIEF DESCRIPTION OF THE DRAWINGS

FIG. 11 is a diagram showing an example of a clock skew between clock signals under measurement measured in noisy mode;

FIG. 12 is a diagram showing a histogram of clock skew shown in FIG. 11;

FIG. 13 is a diagram showing measured value examples of respective RMS values of measured timing jitters $\Delta\phi^j[n]$ and $\Delta\phi^k[n]$, peak-to-peak values $T_{SR}^{pp}$ of skew between the clocks, its RMS values $\sigma_{Skew}$, and cross-correlation coefficients ρ in both noisy mode and quiet mode;

DESCRIPTION OF THE EMBODIMENTS

Figure 16:
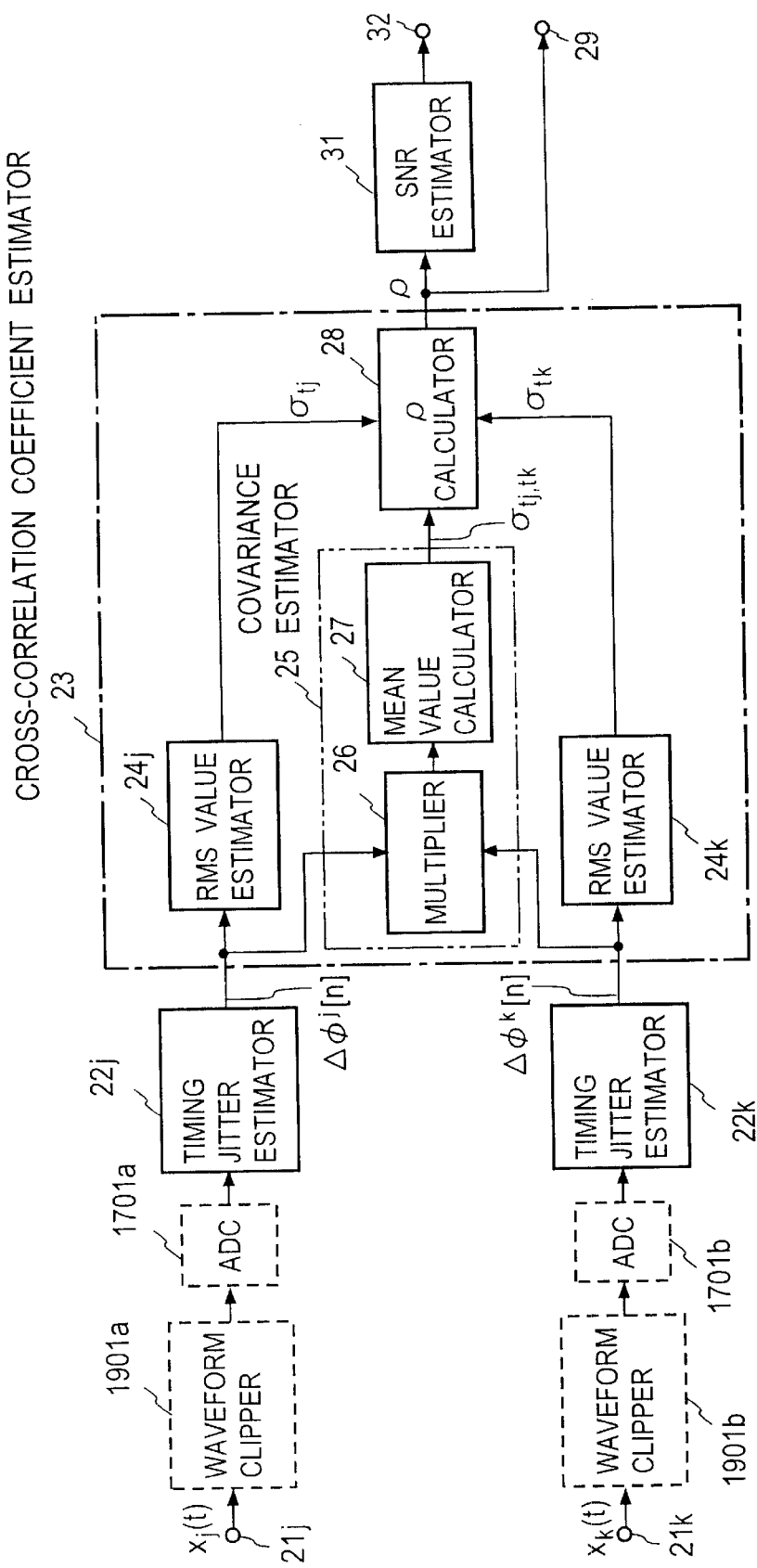
FIG. 16 is a block diagram showing a functional configuration of an embodiment of a cross-correlation coefficient measurement apparatus according to the present invention.

FIG. 16 shows an embodiment of an apparatus according to the present invention.

Signals under measurement $x_j(t)$ and $x_k(t)$ from input terminals 21*j* and 21*k* are inputted to timing jitter estimators 22*j* and 22*k*, respectively and timing jitter sequences $\Delta\phi_j[n]$ and $\Delta\phi^k[n]$ of the respective signals under measurement are estimated by the timing jitter estimators 22*j* and 22*k*, respectively. Those timing jitter sequences $\Delta\phi^j[n]$ and $\Delta\phi^k[n]$ are inputted to a cross-correlation coefficient estimator 23, where a cross-correlation coefficient ρ between zero-crossing points of the respective input signals $x_j(t)$ and $x_k(t)$ is estimated.

In the cross-correlation coefficient estimator 23, RMS values (root-mean-square values) $\sigma_{tj}$ and $\sigma_{tk}$ of the respective inputted timing jitter sequences $\Delta\phi_j[n]$ and $\Delta\phi^k[n]$ are calculated by RMS value estimators 24*j* and 24*k* using the equation (13)' respectively, and in addition, the timing jitter sequences $\Delta\phi^j[n]$ and $\Delta\phi^k[n]$ are inputted to a covariance estimator 25, where a covariance $\sigma_{tj,tk}$ of the both timing jitter sequences is calculated using the equation (11)'. That is, the jitter $\Delta\phi^j[i]$ is multiplied by $\Delta\phi^k[i]$ by a multiplier 26, and a mean value $1/N\Sigma_{i=1}^{N}\Delta\phi^j[i]\cdot\Delta\phi^k[i]$ of a sequence of the multiplied result is calculated by a mean value calculator 27. This calculated result is outputted as the covariance $\sigma_{tj,tk}$.

The RMS values $\sigma_{tj}$ and $\sigma_{tk}$ from the respective RMS estimators 24*j* and 24*k* and the covariance $\sigma_{tj,tk}$ from the covariance estimator 25 are inputted to a ρ calculator (multiplier/divider) 28, and the equation (10) is calculated by the multiplier and divider 28. This calculated result is outputted to an output terminal 29 as a cross-correlation coefficient ρ between zero-crossing points of the signals under measurement $x_j(t)$ and $x_k(t)$.

Moreover, if necessary, this cross-correlation coefficient ρ is inputted to a signal-to-nois ratio (SNR) estimator 31, and the equation (17) is calculated by the SNR estimator 31. This calculated result is outputted to an output terminal 32 as a signal-to-noise ratio between zero-crossing points of the signals under measurement $x_j(t)$ and $x_k(t)$.

Next, the operation for performing a measurement of a cross-correlation coefficient between the signals under measurement $x_j(t)$ and $x_k(t)$ will be explained using an embodiment shown in FIG. 16. That is, the processing procedure of the embodiment of the cross-correlation coefficient measuring method according to the present invention will be explained with reference to FIG. 17. First of all, in steps 201 and 202, timing jitter sequences $\Delta\phi^j[n]$ and $\Delta\phi^k[n]$ of respective signals under measurement are estimated by the first timing jitter estimator 22*j* and the second timing jitter estimator 22*k*, respectively.

Next, in step 203, a cross-correlation coefficient between the signals under measurement $x_j(t)$ and $x_k(t)$ is obtained by the cross-correlation coefficient estimator 23 from the estimated timing jitter sequence $\Delta\phi^j[n]$ and timing jitter sequence $\Delta\phi^k[n]$, and the process ends.

In this step 203 for estimating a cross-correlation coefficient, in steps 203-1 and 203-2, respective root-mean-square values (or RMS values) $\sigma_{tj}$ and $\sigma_{tk}$ of the timing jitter sequence $\Delta\phi^j[n]$ and the timing jitter sequence $\Delta\phi^k[n]$ are obtained by the RMS value estimators 24*j* and 24*k* using the equation (13)', respectively. In addition, in step 203-3, a covariance $\sigma_{tj,tk}$ between the timing jitter sequence $\Delta\phi^j[n]$ and the timing jitter sequence $\Delta\phi^k[n]$ is obtained by the covariance estimator 25 using the equation (11)'. Next, in step 203-4, a cross-correlation coefficient ρ between the signals under measurement is calculated by the multiplier/divider 28 using the root-mean-square value (or RMS value) $\sigma_{tj}$ of the timing jitter sequence, the root-mean-square value (or RMS value) $\sigma_{tk}$ of the timing jitter sequence, and the covariance $\sigma_{tj,tk}$ between those timing jitter sequences by calculating the equation (10). Finally in step 204, the equation (17) is calculated, if necessary, by the signal-to-noise ratio estimator 31 using the ρ to obtain a signal-to-noise ratio between zero-crossing points (timing edges) of the signals under measurement.

Figure 18:
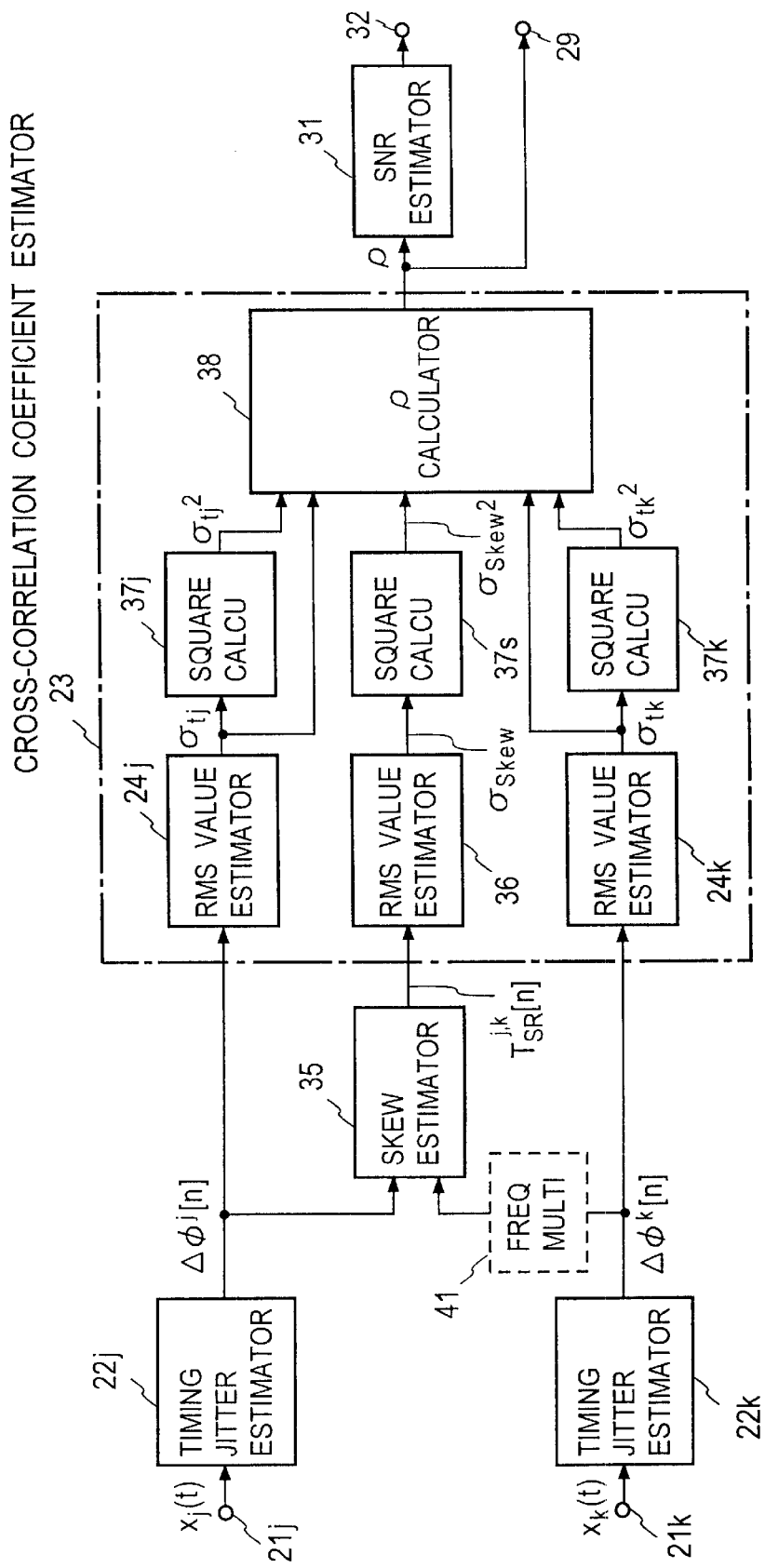
FIG. 18 is a block diagram showing a functional configuration of another embodiment of a cross-correlation coefficient measurement apparatus according to the present invention.

FIG. 18 shows another embodiment of the apparatus according to the present invention. Portions in FIG. 18 corresponding to those in FIG. 16 have the same reference numerals as those in FIG. 16 so that the explanation is simplified. The respective timing jitter sequences $\Delta\phi^j[n]$ and $\Delta\phi^k[n]$ of the signals under measurement $x_j(t)$ and $x_k(t)$ are estimated by the timing jitter estimators $22j$ and $22k$, respectively, and those timing jitter sequences $\Delta\phi^j[n]$ and $\Delta\phi^k[n]$ are inputted to a skew estimator 35, where a random component sequence $T_{SR}^{j,k}[n]$ of a skew between the signals under measurement $x_j(t)$ and $x_k(t)$ is calculated using the second term of right side of the equation (6) or the equation (9). The timing jitter sequences $\Delta\phi^j[n]$ and $\Delta\phi^k[n]$ and the random component sequence $T_{SR}^{j,k}[n]$ of the skew are inputted to the cross-correlation coefficient estimator 23.

In this cross-correlation coefficient estimator 23, respective RMS values (root-mean-square values) of the inputted timing jitter sequences $\Delta\phi^j[n]$ and $\Delta\phi^k[n]$ and the skew random component sequence $T_{SR}^{j,k}[n]$ are calculated by the RMS estimators $24j$, $24k$ and 36, and $\sigma_{tj}$, $\sigma_{tk}$ and $\sigma_{Skew}$ are outputted therefrom, respectively. The $\sigma_{tj}$, $\sigma_{tk}$ are squared by square calculators $37j$, $37k$ and $37s$, respectively. Those squared values $\sigma_{tj}^2$, $\sigma_{tk}^2$, $\sigma_{Skew}^2$ and the RMS values $\sigma_{tj}$, $\sigma_{tk}$, $\sigma_{Skew}$ are inputted to a $\rho$ calculator (multiplier/divider/adder/subtractor) 38, where the equation (14) is calculated, and the calculated result is outputted to an output terminal 29 as a cross-correlation coefficient $\rho$. Also in this case, an SNR value is calculated, if necessary, by the SNR estimator 31 using the $\rho$, and the SNR is outputted to an output terminal 32.

Next, a cross-correlation coefficient between the signals under measurement is measured using the apparatus shown in FIG. 18. A processing procedure of another embodiment of the cross-correlation coefficient measurement method of clocks according to the present invention will be explained with reference to FIG. 19. Steps in FIG. 19 corresponding to those in FIG. 17 have the same reference numerals as those in FIG. 17 so that the explanation is simplified. In steps 201 and 202, the respective timing jitter sequences $\Delta\phi^j[n]$ and $\Delta\phi^k[n]$ of the signals under measurement $x_j(t)$ and $x_k(t)$ are estimated, respectively, and in step 301, a random component sequence $T_{SR}^{j,k}[n]$ of a skew between zero-crossing points of the signals under measurement $x_j(t)$ and $x_k(t)$ is calculated by the clock skew estimator 35 from the timing jitter sequences $\Delta\phi^j[n]$ and $\Delta\phi^k[n]$. Moreover, in step 203, a cross-correlation coefficient $\rho$ between the signals under measurement $x_j(t)$ and $x_k(t)$ is obtained by the cross-correlation coefficient estimator 23 from the estimated timing jitter sequences $\Delta\phi^j[n]$ and $\Delta\phi^k[n]$ and the skew sequence $T_{SR}^{j,k}[n]$, and the process ends.

In this step 203, in steps 203-1 and 203-2, respective root-mean-square values (or RMS values) of the timing jitter sequences $\Delta\phi^j[n]$ and $\Delta\phi^k[n]$ are obtained. In addition, in step 302, a root-mean-square value (or RMS value) askew of skew sequence of the signals under measurement is obtained by an RMS estimator 36 using the equation (8). Next in step 303, respective squared values of the root-mean-square values $\sigma_{tj}$, $\sigma_{tk}$ and $\sigma_{Skew}$ are obtained, and in step 304, the equation (14) is calculated by the multiplier/divider/adder/subtractor 38 using $\sigma_{tj}$, $\sigma_{tk}$, $\sigma_{tj}^2$, $\sigma_{tk}^2$ and $\sigma_{Skew}^2$ to obtain a cross-correlation coefficient $\rho$ between the signals under measurement.

Finally, in step 204, a signal-to-noise ratio between timing edges of the signals under measurement is calculated if necessary.

Figure 17:
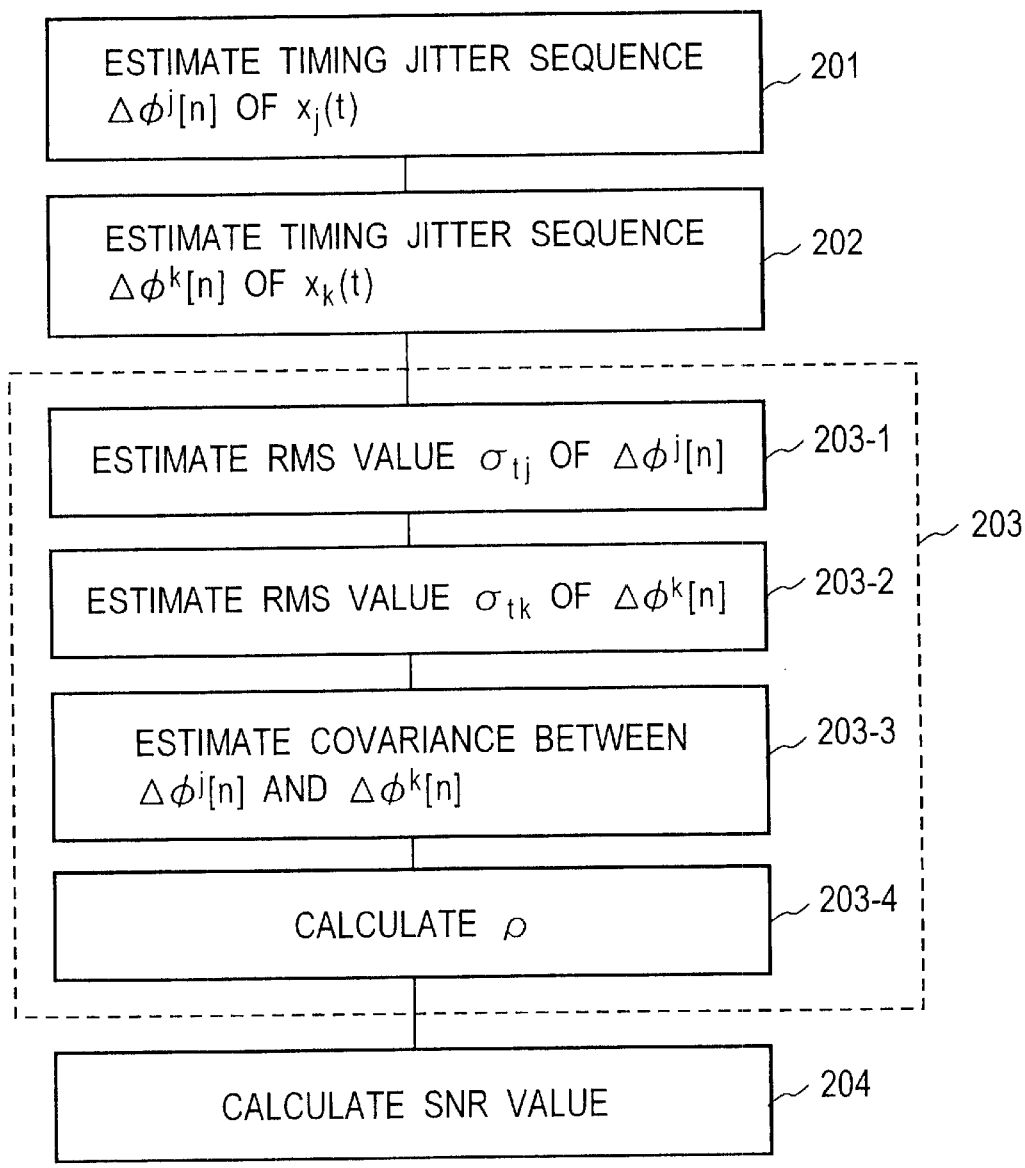
FIG. 17 is a flow-chart showing an embodiment of a cross-correlation coefficient measurement method according to the present invention.
Figure 19:
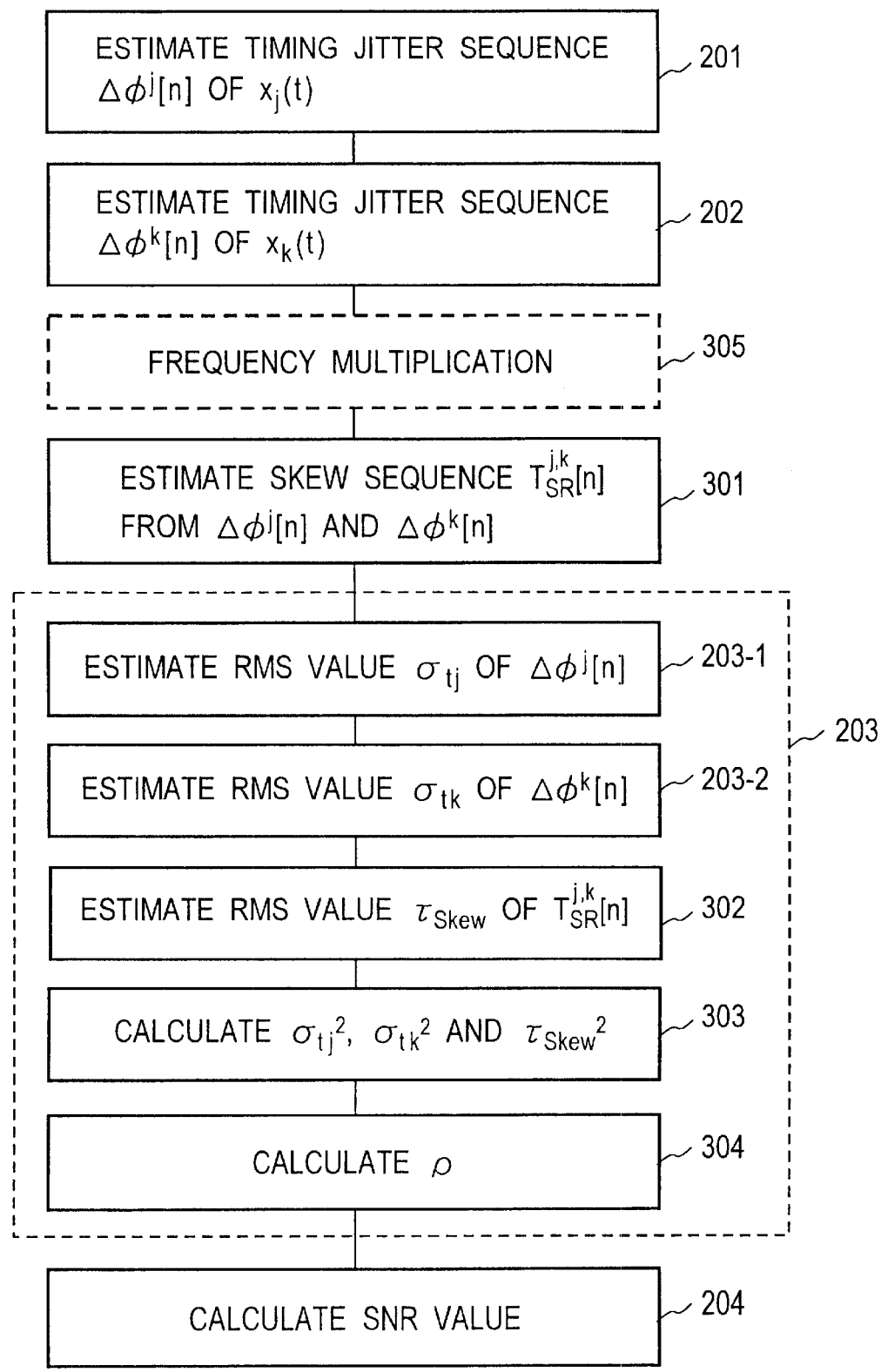
FIG. 19 is a flow-chart showing another embodiment of a cross-correlation coefficient measurement method according to the present invention.

In FIG. 17 and FIG. 19, regarding the sequence of the steps 201 and 202, either the step 201 or the 202 may be is performed first. The processing sequence of the steps 203-1, 203-2, and 303 may be arbitrary. Either the step combination of the steps 201 and 203-1 or the steps 202 and 203-2 may be performed first.

Figure 1:
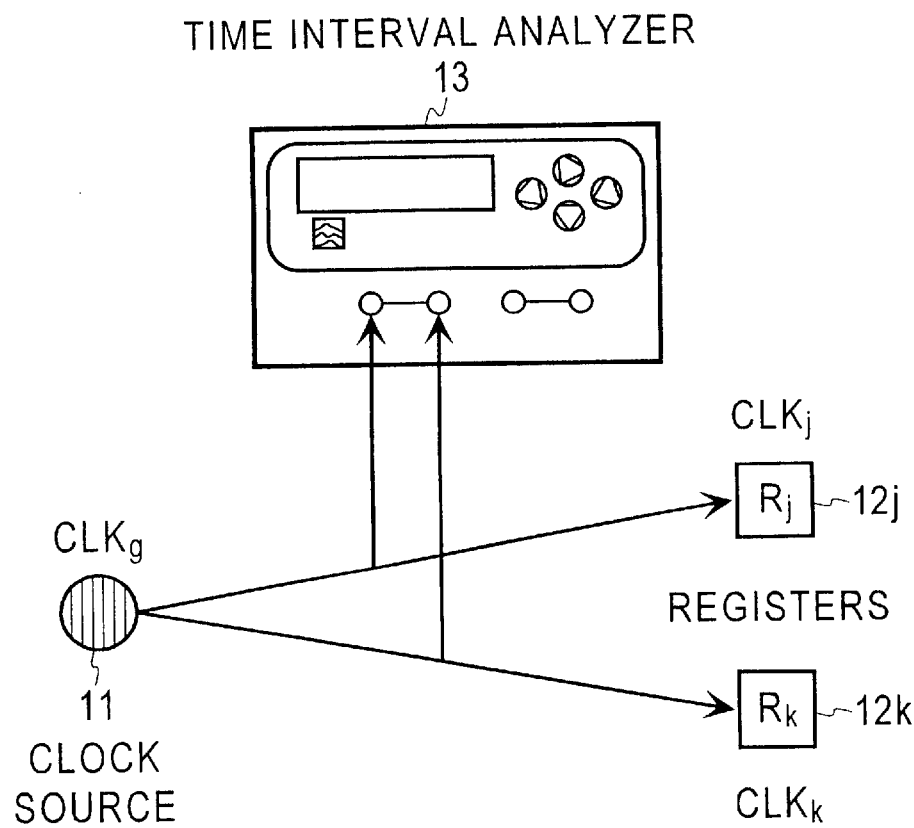
FIG. 1 is a diagram showing an example of a clock skew measurement using a time interval analyzer.
Figure 2:
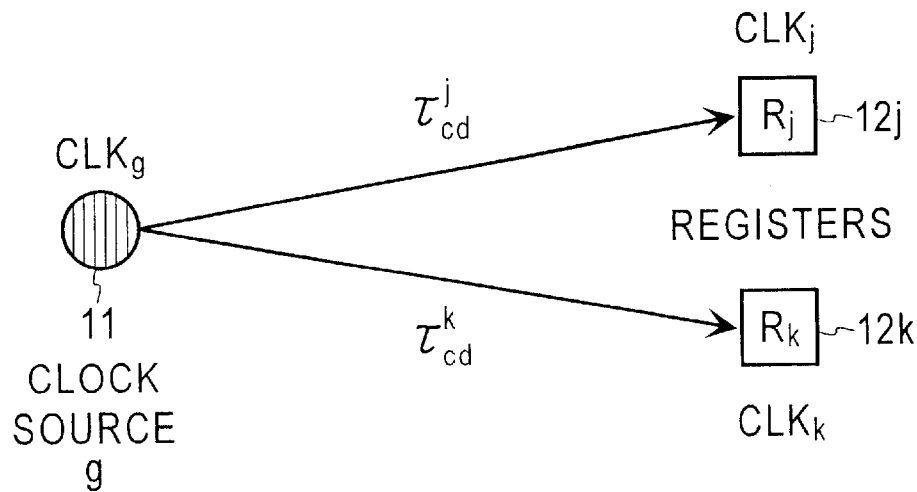
FIG. 2 is a diagram typically showing a clock distribution network.
Figure 3:
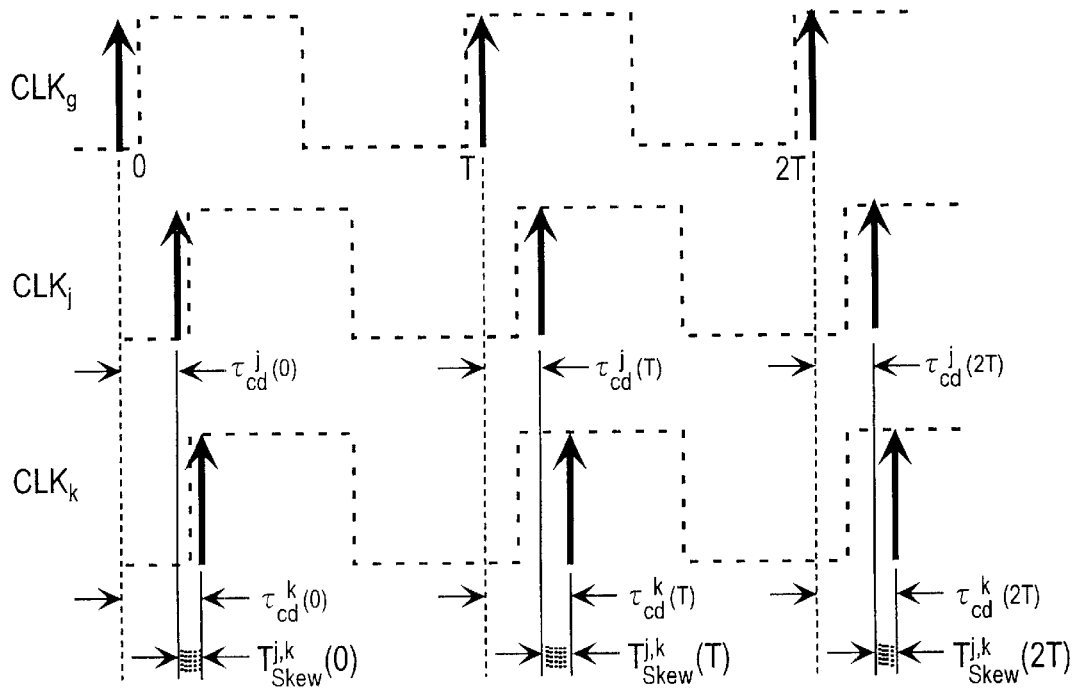
FIG. 3 is a diagram typically showing a timing of clock skew.
Figure 4:
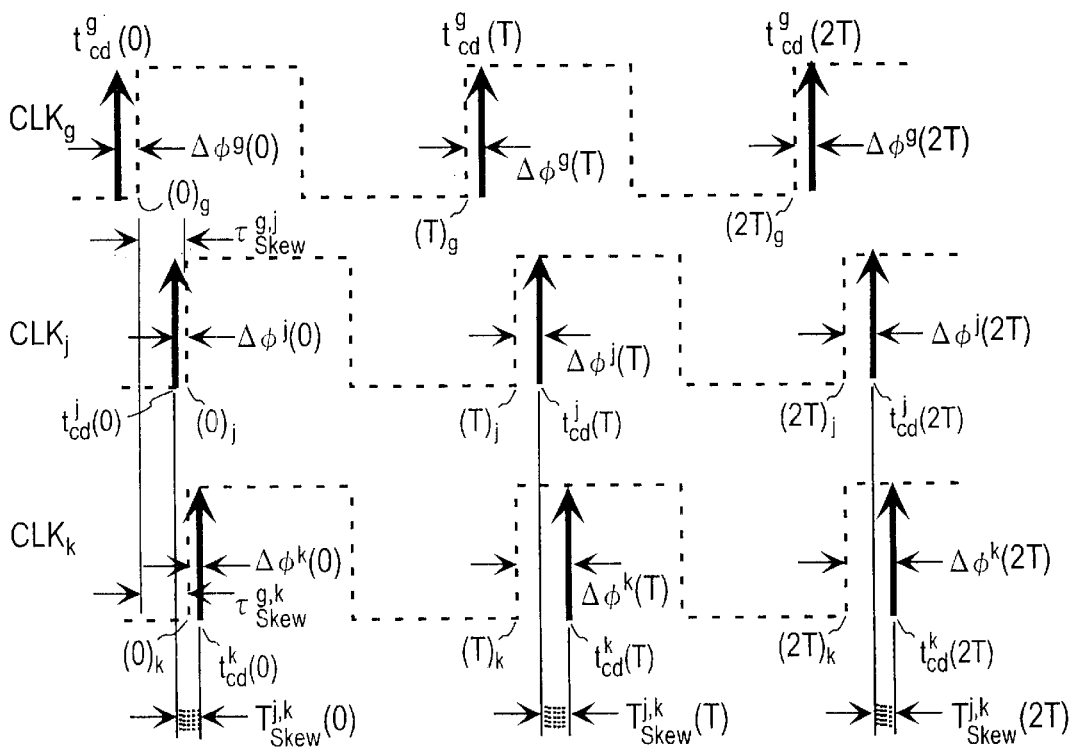
FIG. 4 is a diagram typically showing a relationship between a timing jitter and a clock skew.
Figure 5:
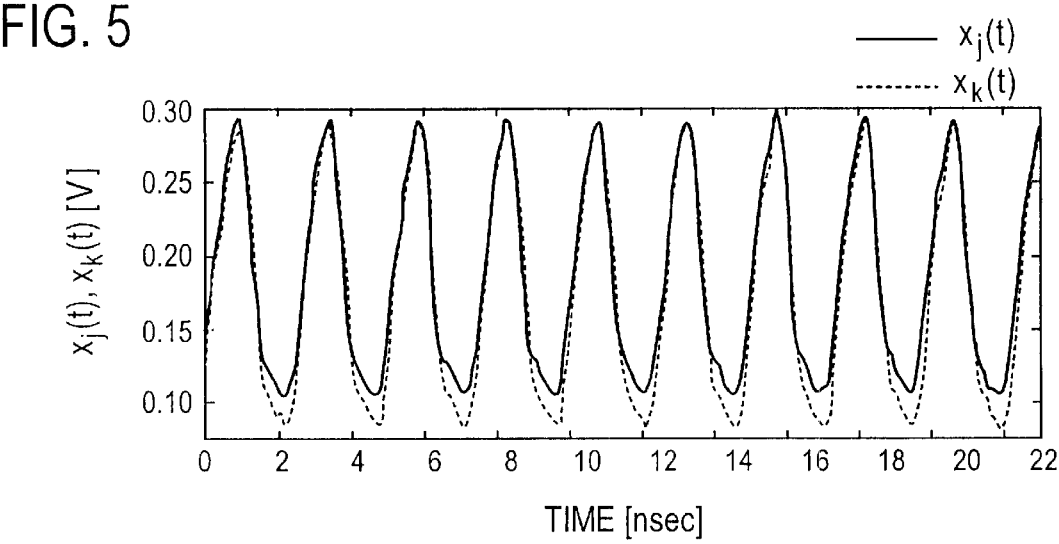
FIG. 5 is a diagram showing an example of a clock signal under measurement.
Figure 6A:
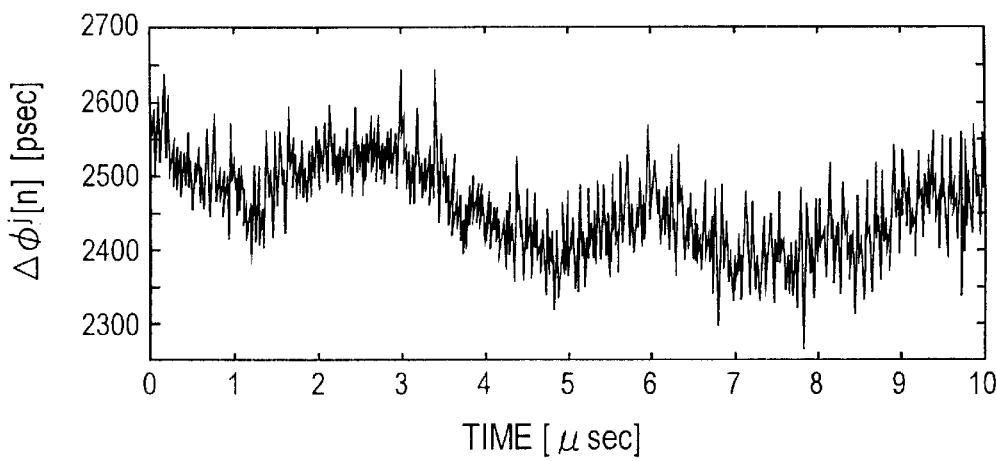
FIG. 6A is a diagram showing an example of a timing jitter Δφ$^j$[n] of a clock signal under measurement x$_j$(t)
Figure 6B:
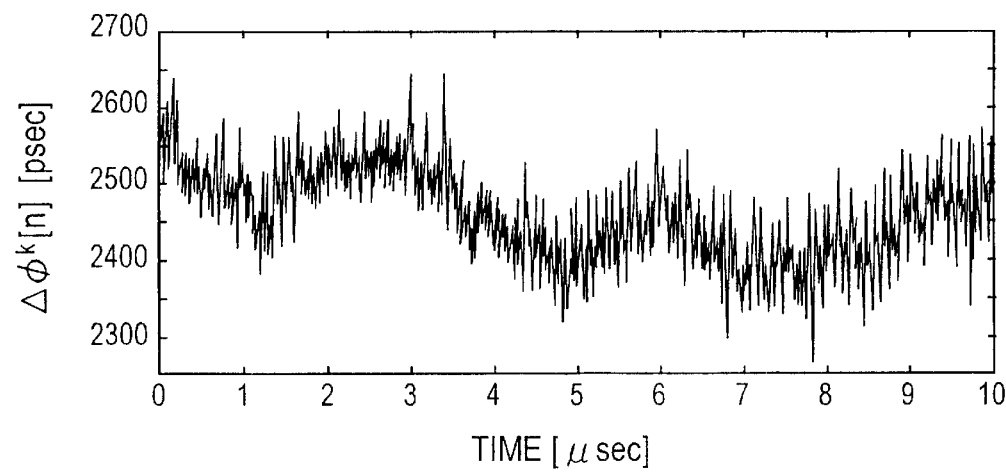
FIG. 6B is a diagram showing an example of a timing jitter Δφ$^k$[n] of a clock signal under measurement x$_k$(t)
Figure 7:
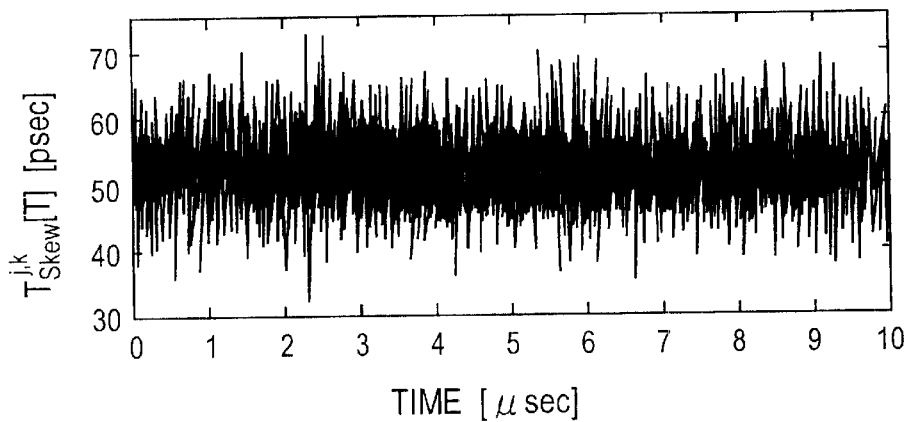
FIG. 7 is a diagram showing an example of a clock skew between measured clock signals under measurement.
Figure 8:
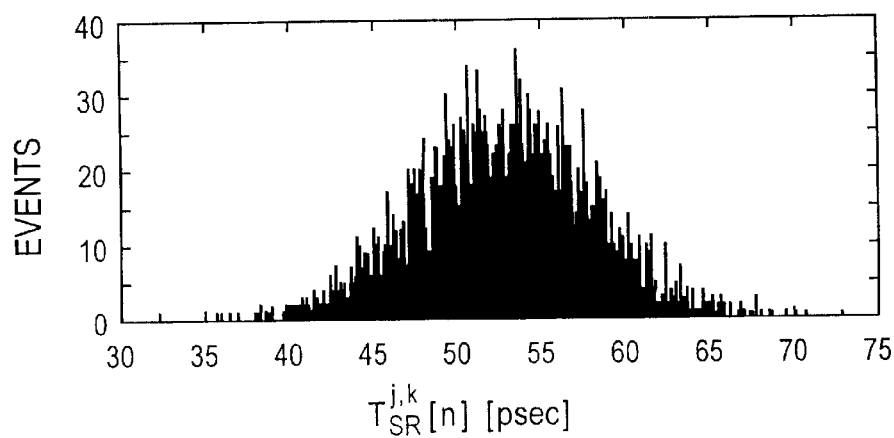
FIG. 8 is a diagram showing a histogram of clock skew between clock signals under measurement shown in FIG. 7.
Figure 9:
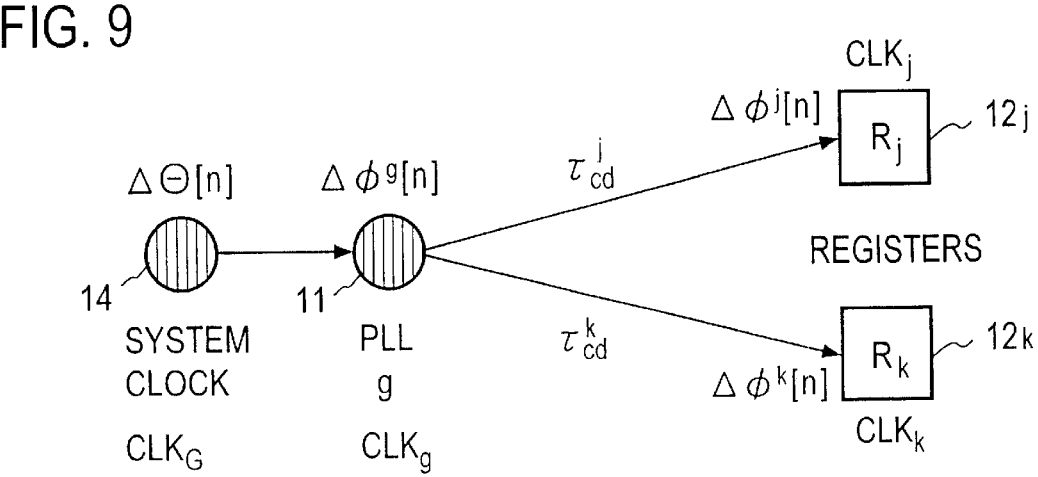
FIG. 9 is a diagram typically showing a clock distribution network having different clock domains.
Figure 10:
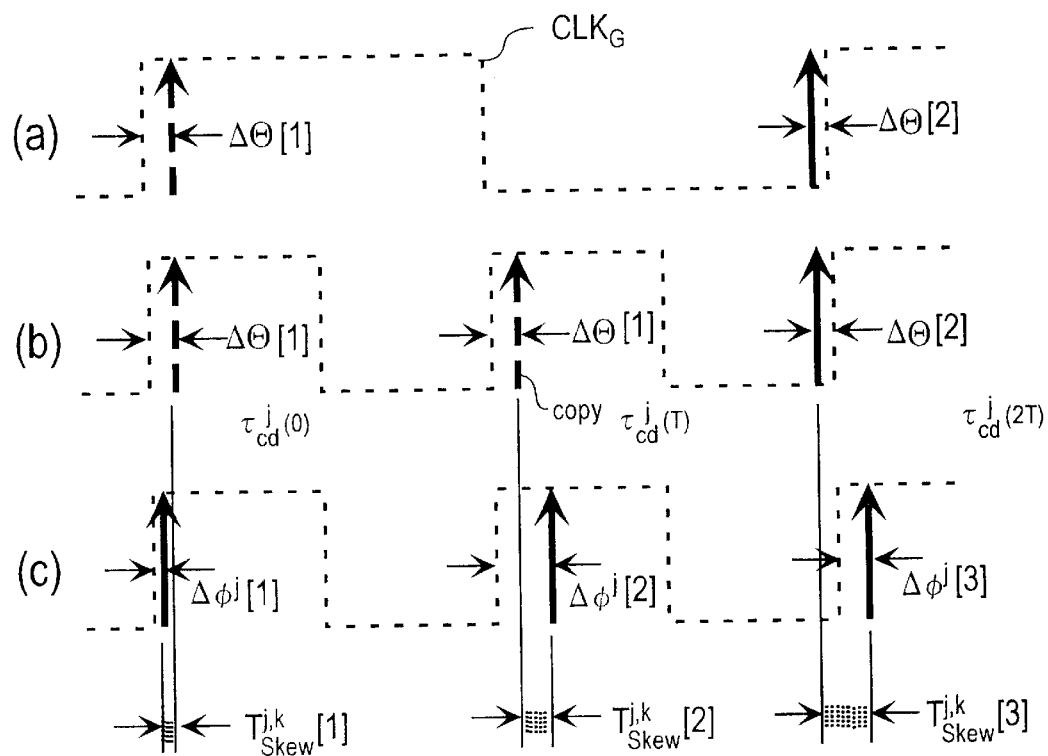
FIG. 10 is a diagram typically showing a principle of clock skew measurement using a frequency multiplication.
Figure 14:
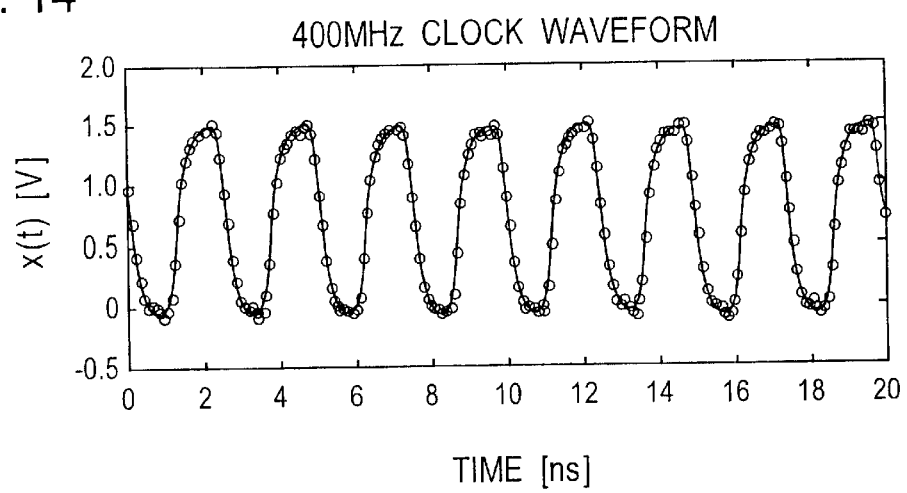
FIG. 14 is a diagram showing an example of digitized clock signal under measurement.

For example, when the frequence of the signal under measurement $x_j(t)$ is an approximately multiple M time frequency of that of the other signal under measurement $x_k(t)$. As indicated by dashed lines in FIG. 18, the timing jitter sequence $\Delta\phi^k[n]$ is assigned (M−1) times by a frequency multiplier 41 to obtain a timing jitter sequence of the signal under measurement $x_k(t)$ whose frequency is multiplied by M, and the obtained timing jitter sequence is supplied to the skew estimator 35. By this process, in the clock distribution system explained with reference to FIG. 10, the signal under measurement $x_k(t)$ in FIG. 18 corresponds to the system clock signal $CLK_G$ in FIG. 10, and the signal $x_j(t)$ is equal to a signal created by multiplying the frequency of the clock signal $CLK_G(x_k(t))$ by M. In this case, a random component sequence $T_{SR}^{j,k}[n]$ of clock skew between the clock signal $CLK_G(x_k(t))$ and the clock signal $x_j(t)$ can be obtained using the second term of right side of the equation (9).

A processing procedure of the cross-correlation coefficient measurement method in this case may be, as shown in FIG. 19, that after obtaining a timing jitter sequence in step 202, as indicated by dashed lines, the timing jitter sequence estimated by the timing jitter estimator $22k$ is assigned, for example, (M−1) times by the frequency multiplier 41 in step 305 to obtain a timing jitter sequence that is created by multiplying the frequency of the clock signal under measurement by M, and the process moves to step 203.

Figure 20:
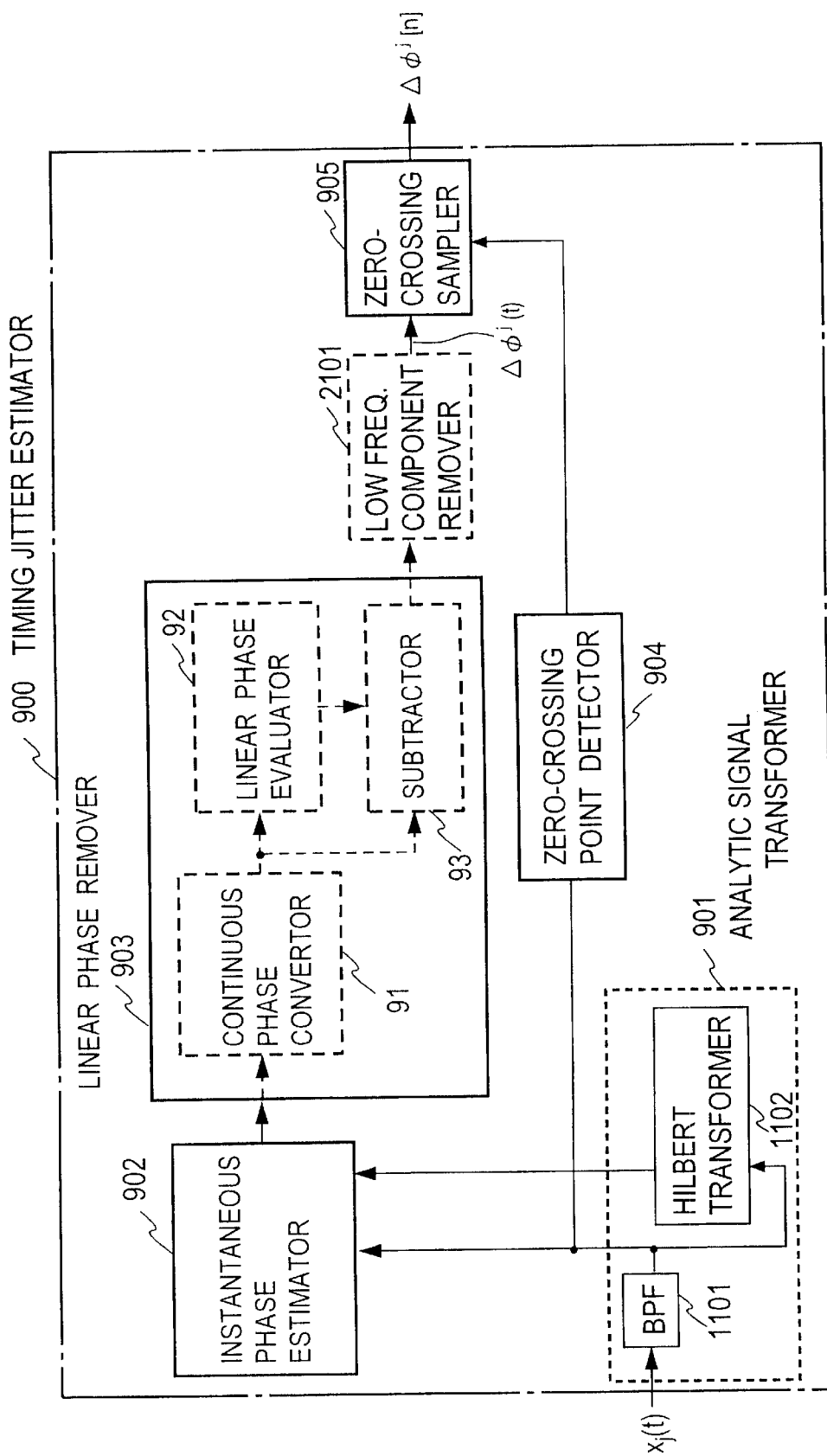
FIG. 20 is a block diagram showing a functional configuration example of a timing jitter estimator used in the cross-correlation coefficient measurement apparatus according to the present invention.

FIG. 20 shows an example of a configuration of a timing jitter estimator $22j$ or $22k$ used in the cross-correlation coefficient measurement apparatus according to the present invention. This timing jitter estimator 900 comprises, for example, an analytic signal transformer 901 for transforming a signal under measurement into a band-limited complex analytic signal, an instantaneous phase estimator 902 for obtaining an instantaneous phase of the analytic signal transformed by the analytic signal transformer 901, a linear phase remover 903 for removing a linear instantaneous phase from the instantaneous phase estimated by the instantaneous phase estimator 902 to obtain an instantaneous phase noise, a zero-crossing point detector 904 to which a real part of the analytic signal is inputted from the analytic signal transformer 901 for generating sampling pulses at timings (approximated zero-crossing points) close to zero-crossing timings of the real part of the analytic signal, a zero-crossing sampler 905 to which the instantaneous phase noise estimated by the linear phase remover 903 is inputted for sampling the instantaneous phase noise using the sampling pulses from the zero-crossing point detector 904 and for outputting a timing jitter sequence. The analytic signal transformer 901 may be constructed such that a pass bandwidth of a signal can arbitrarily be changed.

A processing procedure in this timing jitter estimator 900 will be explained with reference to FIG. 21. In step 1001, an inputted signal under measurement is transformed by the analytic signal transforming means 901 into an analytic signal such that the analytic signal is created by selectively passing predetermined frequencies of the inputted signal under measurement. In step 1002, an instantaneous phase of the signal under measurement is estimated by the instantaneous phase estimator 902 using the analytic signal. In step 1003, a linear instantaneous phase corresponding to a jitter-free ideal signal under measurement is estimated by the linear phase remover 903 from the instantaneous phase. In step 1004, the linear instantaneous phase is removed by the linear phase remover 903 from the instantaneous phase to estimate an instantaneous phase noise $\Delta\phi^j(t)$. At the same time, in step 1005, a timing (approximated zero-crossing point) closest to a zero-crossing point of a real part of the analytic signal is detected by the zero-crossing point detector 904 from the real part of the analytic signal using the previously explained approximated zero-crossing point detection method. Finally, in step 1006, only the instantaneous phase noise data at the approximated zero-crossing points are sampled by the zero-crossing sampler 905 from the instantaneous phase noise to estimate a timing jitter sequence $\Delta\phi^j[n]$, and the process ends.

In the analytic signal transformer 901 used in the timing jitter estimator 900, for example as shown in FIG. 20, only components around a fundamental frequency are extracted by a band-pass filter 1101 from the signal under measurement to band-limit the signal under measurement. In addition, the band-limited signal under measurement is inputted to a Hilbert transformer 1102 to Hilbert-transform this signal. And an output of the band-pass filter 1101 is outputted as a real part of the analytic signal. An output of the Hilbert transformer 1102 is outputted as an imaginary part of the analytic signal. The band-pass filter 1101 may be either an analog filter or a digital filter, or may be packaged using a digital signal processing such as FFT or the like. In addition, the band-pass filter 1101 may be constructed such that the pass bandwidth of the signal can arbitrarily be changed.

Figure 15A:
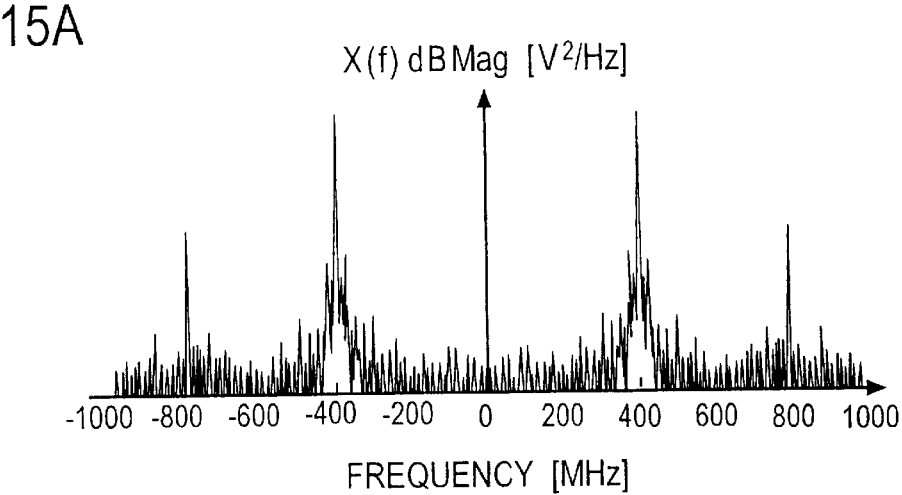
FIG. 15A is a diagram showing an example of a both-sided power spectrum of a clock signal under measurement obtained by FFT.
Figure 15B:
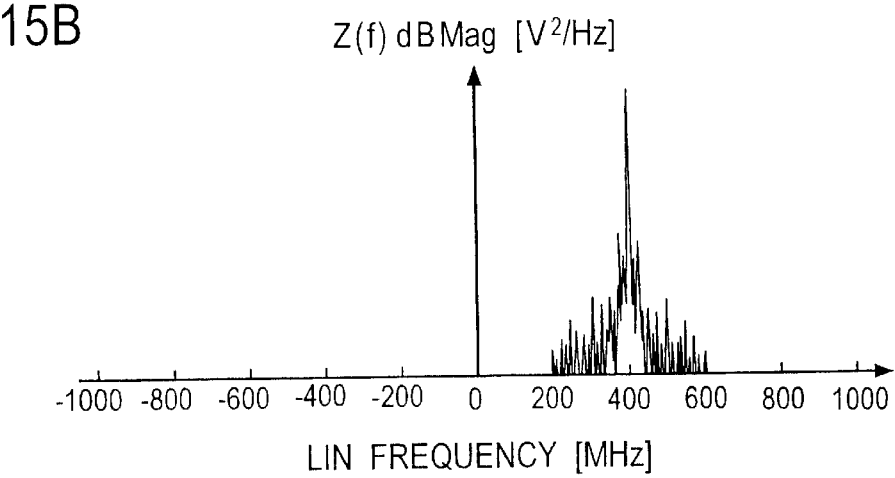
FIG. 15B is a diagram showing an example of a band-limited single-sided power spectrum.
Figure 22:
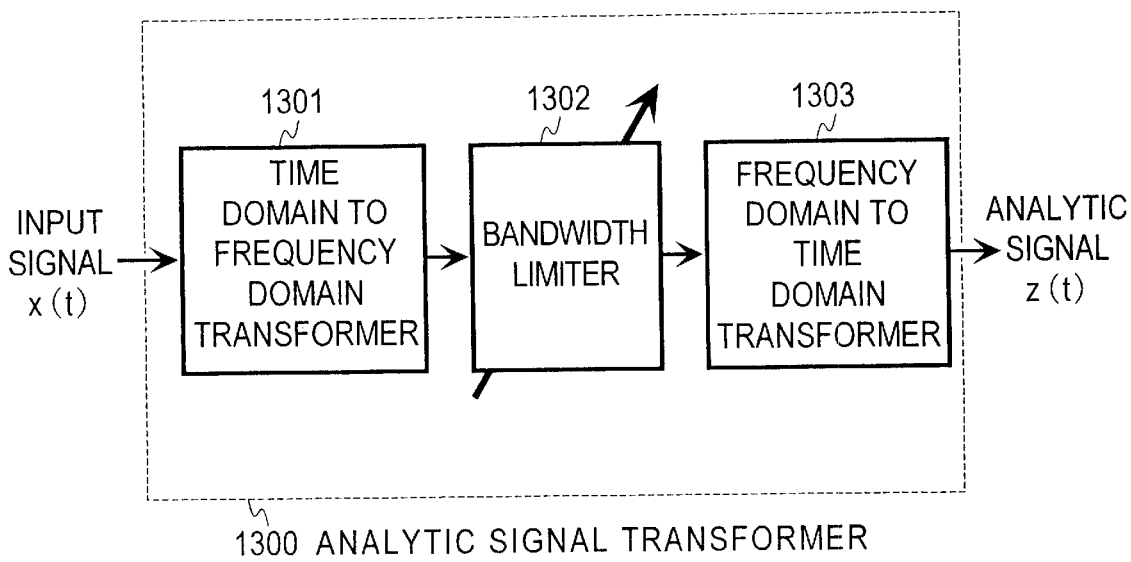
FIG. 22 is a block diagram showing another example of a functional configuration of an analytic signal transformer used in the cross-correlation coefficient measurement apparatus according to the present invention.

FIG. 22 shows another configuration example of the analytic signal transformer 901 used in the timing jitter estimator 900. For example, FFT (Fast Fourier Transform) is applied to the signal under measurement by a time domain to frequency domain transformer 1301 to transform the signal in time domain into a both-sided spectrum signal (for example, FIG. 15A) in frequency domain. Negative frequency components of the transformed both-sided spectrum signal in frequency domain are replaced by zero by the bandwidth limiter 1302 to obtain a single-sided spectrum signal. In addition, regarding this single-sided spectrum signal, only components around the fundamental frequency of the signal under measurement are retained and the other frequency components are replaced by zeros to gate the band-limit the signal in frequency domain. Inverse FFT is applied by a frequency domain to time domain transformer 1303 to the band-limited single-sided spectrum signal to transform the signal in frequency domain into an analytic signal in time domain.

Figure 23:
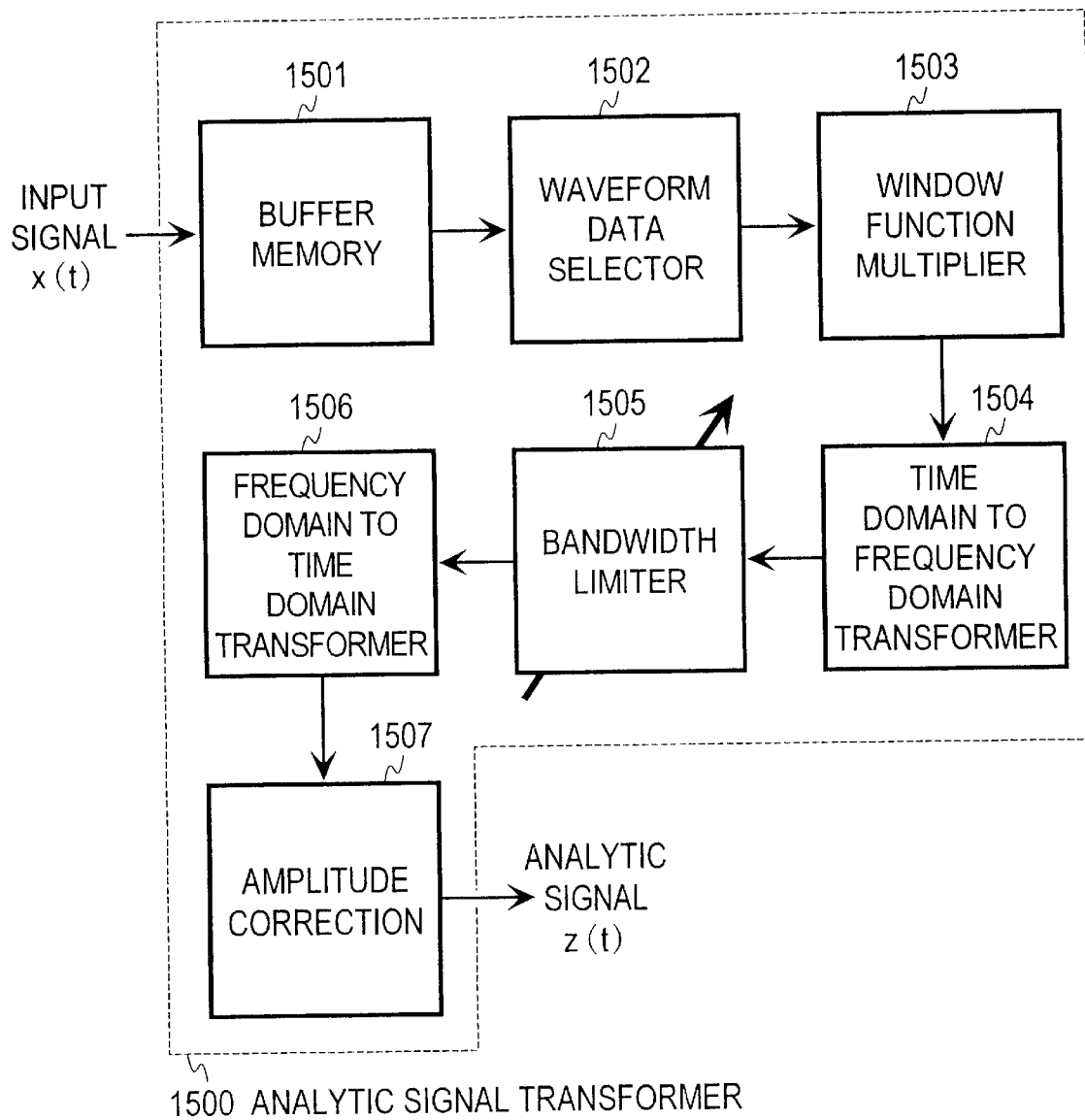
FIG. 23 is a block diagram showing further another example of a functional configuration of the analytic signal transformer used in the cross-correlation coefficient measurement apparatus according to the present invention.

FIG. 23 shows further another configuration example of the analytic signal transformer 901 used in the timing jitter estimator 900. This analytic signal transformer 1500 comprises a buffer memory 1501 for storing therein a signal under measurement, waveform data selector 1502 for extracting the signal in the sequential order from the buffer memory 1501 such that the signal being extracted is partially overlapped with the signal extracted just before, a window function multiplier 1503 for multiplying each extracted partial signal by a window function, a time domain to frequency domain transformer 1504 for transforming each partial signal multiplied by the window function into a both-sided spectrum signal in frequency domain, a bandwidth limiter 1505 for extracting only components around a positive fundamental frequency of the signal under measurement from the both-sided spectrum signal transformed in frequency domain, a frequency domain to time domain transformer 1506 for inverse-transforming an output of the bandwidth limiter 1505 into a signal in time domain, and an amplitude corrector (inverse window function multiplier) 1507 for multiplying the transformed signal in time domain by an inverse number of the window function to obtain a band-limited analytic signal. The time domain to frequency domain transformer 1504 and the frequency domain to time domain transformer 1506 may be packaged using FFT and inverse FFT, respectively. In addition, the bandwidth limiter 1505 may be constructed such that the pass bandwidth of the signal can arbitrarily be changed.

Figure 24:
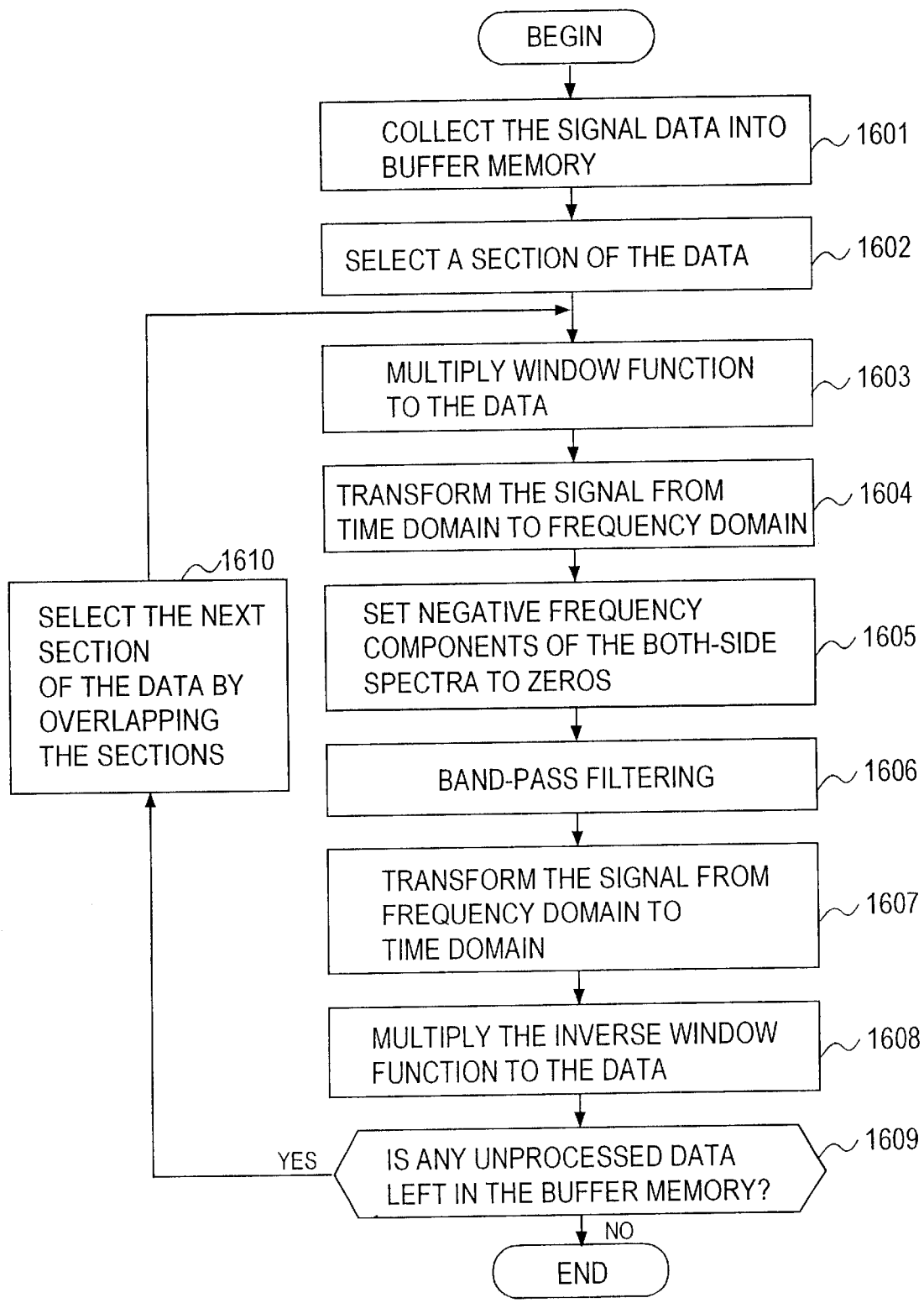
FIG. 24 is a flow-chart showing further another example of the analytic signal transformation method used in the cross-correlation coefficient measurement method according to the present invention.

The operation in the case of transforming the signal under measurement into a band-limited analytic signal using this analytic signal transformer 1500 will be described with reference to FIG. 24. First, in step 1601, the buffer memory 1501 stores therein the signal under measurement. Next, in step 1602, the waveform data selector 1502 extracts a portion of the stored signal from the buffer memory 1501. In step 1603, the window function multiplier 1503 multiplies the extracted partial signal by the window function. In step 1604, the time domain to frequency domain transformer 1504 applies FFT to the partial signal multiplied by the window function to transform the signal in time domain into a both-sided spectrum signal in frequency domain. In step 1605, the bandwidth limiter 1505 replaces negative frequency components of the transformed both-sided spectrum signal in frequency domain with zero. Furthermore, in step 1606, the bandwidth limiter 1505 retains only components around the fundamental frequency of the signal under measurement in the single-sided spectrum signal produced by replacing negative frequency components with zero and replaces the other frequency components with zero to limit the bandwidth of the signal in frequency domain. In step 1607, the frequency domain to time domain transformer 1506 applies inverse FFT to the band-limited single-sided spectrum signal in frequency domain to transform the signal in frequency domain into a signal in time domain. In step 1608, the inverse window function multiplier 1507 multiplies the inverse-transformed signal in time domain by an inverse number of the window function used in the multiplication in the step 1603 to obtain a band-limited analytic signal. Finally, in step 1609, a check is made to see if there is unprocessed data remaining in the buffer memory 1603. If there is unprocessed data remaining in the buffer memory, the signal extractor 1502 extracts, in step 1610, the signal in the sequential order from the buffer memory 1501 such that the signal being extracted is partially overlapped with the signal extracted just before, and thereafter the steps 1603, 1604, 1605, 1606, 1607, 1608 and 1609 are repeated. If there is no unprocessed data, the process ends. The processing sequence of the step 1605 and the step 1606 may be exchanged. That is, only components around the fundamental frequency of the signal under measurement are retained and the other frequency components are replaced with zero first to limit the bandwidth of the signal in frequency domain, and thereafter negative frequency components of the both-sided spectrum signal may be replaced with zero.

In the linear phase remover 903 in the timing jitter estimator 900 shown in FIG. 20, for example as illustrated in the figure, an inputted instantaneous phase is converted into a continuous instantaneous phase by a continuous phase converter 91. Regarding the continuous instantaneous phase, its linear instantaneous phase, i.e., a linear instantaneous phase of a jitter-free ideal signal is estimated by a linear phase estimator 92 using, for example, a linear trend estimation method, i.e., by applying a linear line fitting by least squares method to the continuous instantaneous phase. In addition, the linear instantaneous phase is subtracted from the continuous instantaneous phase by a subtractor 93 to output an instantaneous phase noise Δφ(t).

As indicated by dashed lines in FIG. 16, analog signals under measurement $x_j(t)$ and $x_k(t)$ may be digitized by AD converters 1701a and 1701b, respectively to convert the analog signals into digital signals, and the digital signals may be inputted to the respective timing jitter estimators 22j and 22k. In addition, as indicated by dashed lines in FIG. 16, waveform clippers 1901a and 1901b may be provided to supply those signals under measurement $x_j(t)$ and $x_k(t)$ to the AD converters 1701a and 1701b or to the timing jitter estimators 22j and 22k, respectively after removing AM components in the state that phase modulation components that are jitter components of the respective signals are retained in the signals under measurement. The waveform clippers 1901a and 1901b may be provided in the output sides of the AD converters 1701a and 1701b, respectively. The AD converters and the waveform clippers can also be applied to the embodiment shown in FIG. 18.

In addition, as indicated by dashed lines in FIG. 20, low frequency components of the instantaneous phase noise may be removed by a low frequency component remover 2101 from the instantaneous phase noise Δφ(t) outputted from the linear phase remover 903, and the instantaneous phase noise from which low frequency components have been removed may be supplied to the zero-crossing sampler 905.

In the above description, the instantaneous phase noise Δφ(t) is sampled at approximated zero-crossing points to obtain a timing jitter sequence Δφ'[n]. However, since the linear phase remover 903 has a configuration as shown in FIG. 20, for example as indicated by dashed lines in FIG. 25, the sampling at approximated zero-crossing points may be inserted in series between the instantaneous phase estimator 902 and the continuous phase converter 91. Alternatively, the sampling at approximated zero-crossing points may be inserted in series between the continuous phase converter 91 and the linear phase estimator 92/the subtractor 93. In such a configuration, a timing jitter sequence Δφ'[n] can also be obtained from the subtractor 93.

Figure 21:
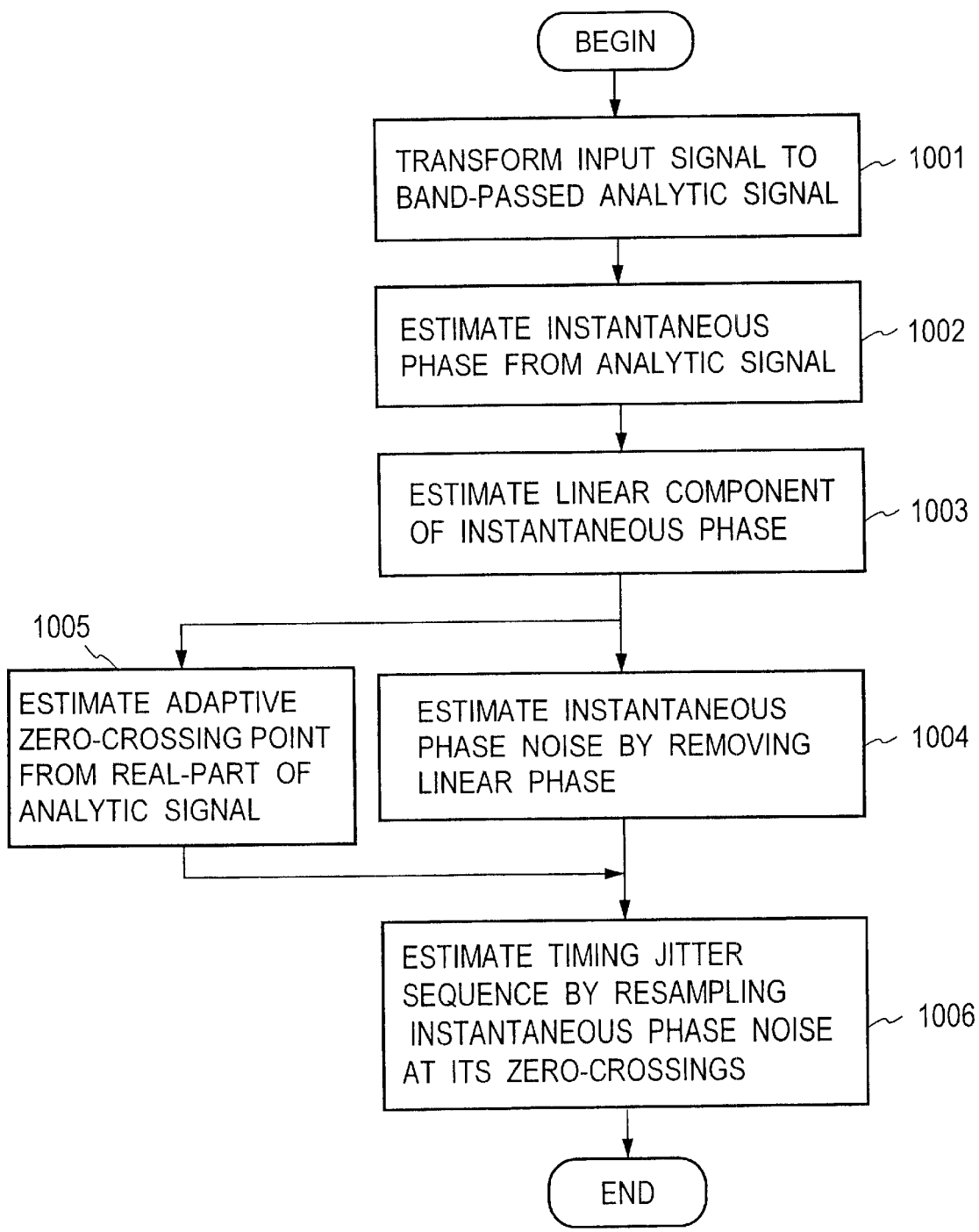
FIG. 21 is a flow-chart showing an example of a timing jitter estimation method used in the cross-correlation coefficient measurement apparatus according to the present invention.
Figure 26:
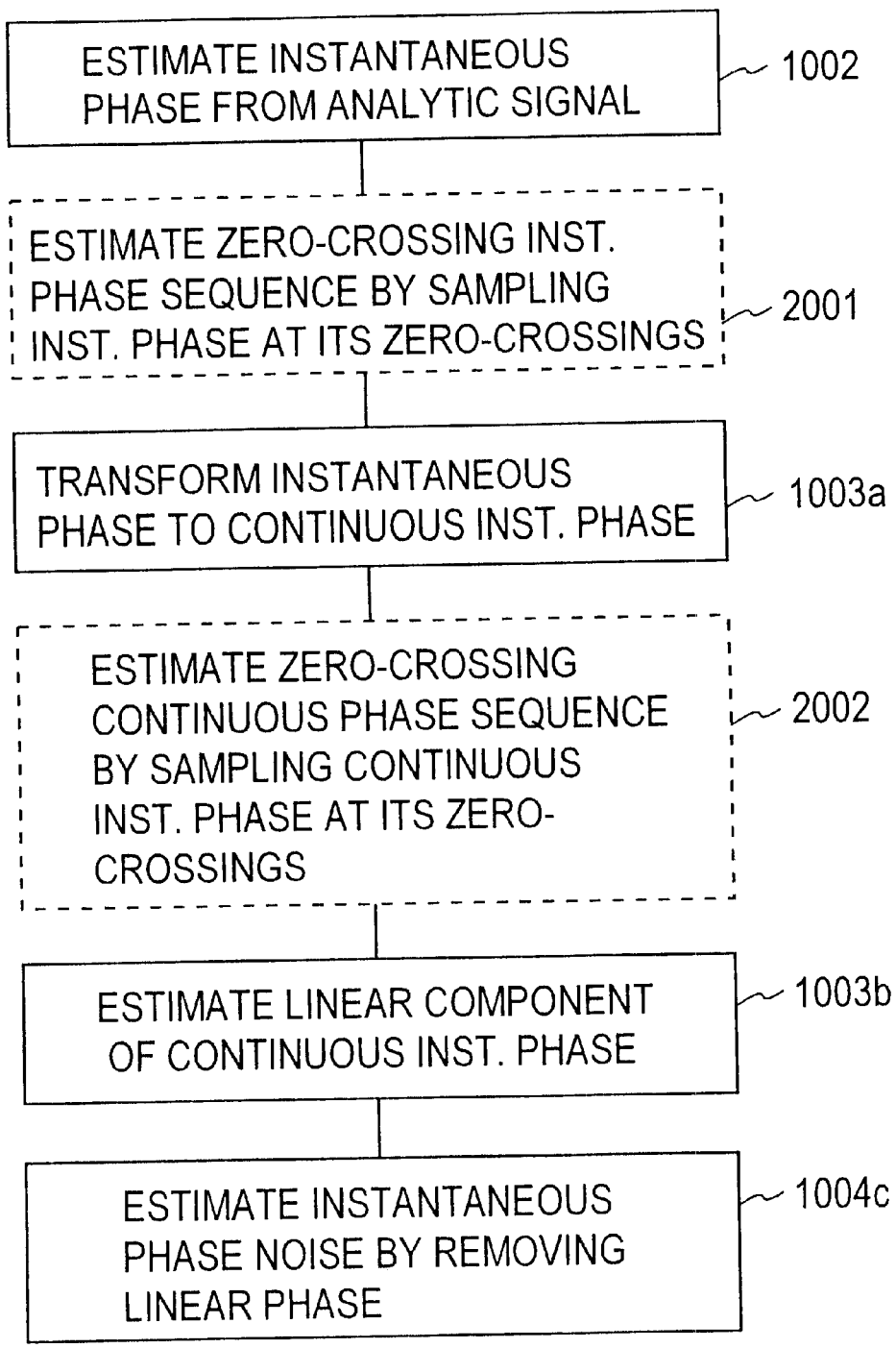
FIG. 26 is a flow-chart showing a portion of another embodiment of the method according to the present invention.

In addition, since the estimation of an instantaneous phase noise Δφ(t) from an instantaneous phase is performed by the configuration shown by the linear phase remover 903 in FIG. 20, the processing procedure is, as shown in FIG. 26, that after an instantaneous phase is obtained in the step 1002 in FIG. 21, in step 1003a, the instantaneous phase is converted into a continuous instantaneous phase by the continuous phase converter 91, and in step 1003b, a linear instantaneous phase of the continuous instantaneous phase is estimated by the linear phase estimator 92 from the continuous instantaneous phase. After that, in step 1004, the linear instantaneous phase is removed by the subtractor 93 from the continuous instantaneous phase to obtain an instantaneous phase noise Δφ(t).

Figure 25:
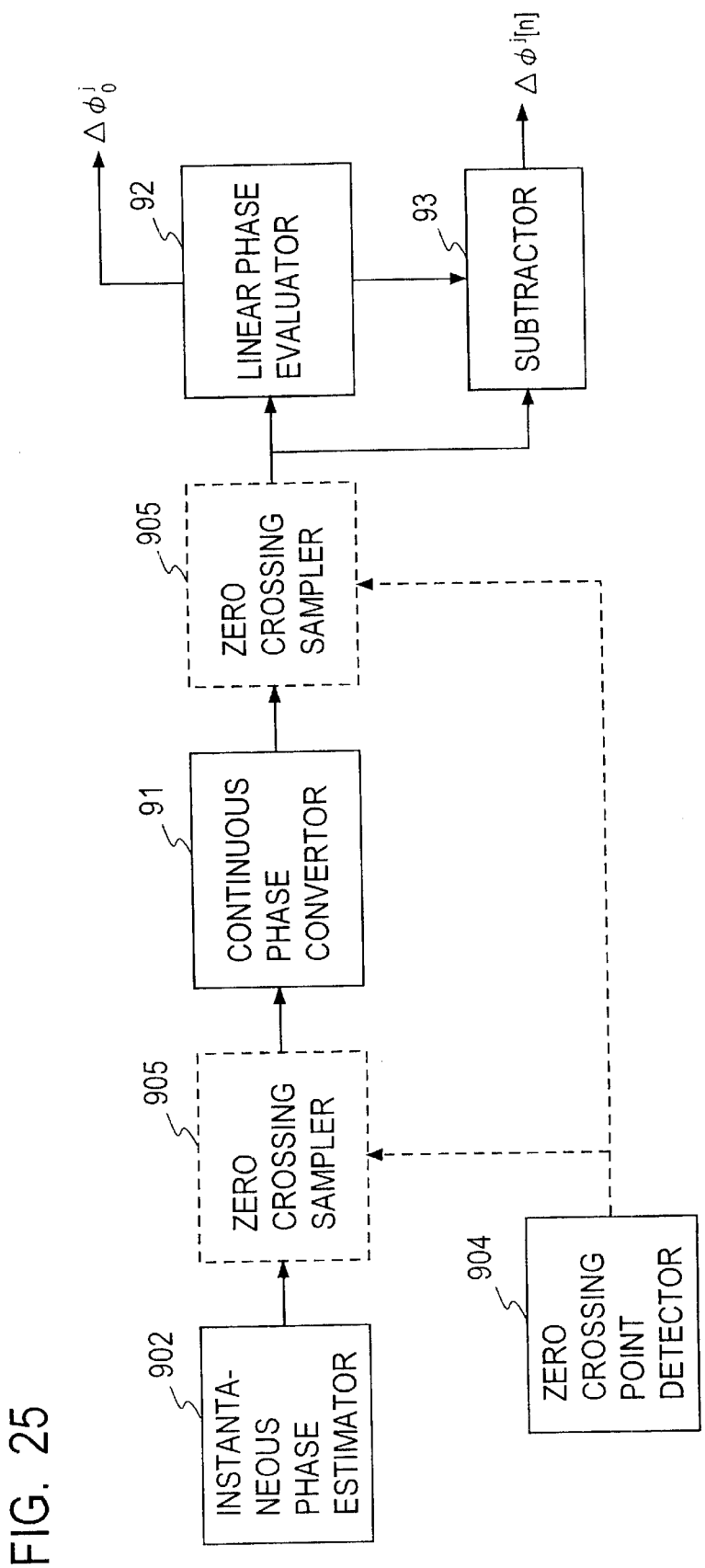
FIG. 25 is a block diagram showing a portion of another embodiment of an apparatus according to the present invention.

Therefore, similarly to the configuration shown in FIG. 25, as indicated by dashed lines in FIG. 26, the approximated zero-crossing sampling may be applied to the instantaneous phase in step 2001 after the step 1002 to obtain a sample sequence of the instantaneous phase. And then the process may move to the step 1003a to transform the sample sequence into a continuous instantaneous phase. Alternatively, in step 2002, the continuous phase obtained in the step 1003a may be sampled at the approximated zero-crossing points to obtain a sample sequence of the continuous instantaneous phase, and then the process may move to step 1003b to estimate a linear instantaneous phase from the sample sequence of the continuous instantaneous phase. In either case, in step 1004, there is obtained a timing jitter sequence Δφ'[n] created by sampling the instantaneous phase noise at the approximated zero-crossing points.

The apparatus shown in FIG. 16 and FIG. 18 can also be functioned by executing programs in a computer.

According to the cross-correlation coefficient measurement apparatus and the cross-correlation coefficient measurement method of the present invention, a cross-correlation coefficient between signals under measurement can be measured, and furthermore if necessary, a signal-to-noise ratio can be measured at the same time. The present invention provides a solution to the following problems that cannot be solved by the conventional apparatus or the conventional method in which only a skew between signals is measured. Note that, since a cross-correlation coefficient is a normalized quantity, the cross-correlation coefficient takes a value between −1 and +1. For this reason, how much room of improvement is left to a performance limit (ρ=1) or how much the degradation is from the performance limit can quantitatively be grasped based on a cross-correlation coefficient. In addition, if the apparatus is constructed such that a signal-to-noise ratio can be measured, a quality measure such as an error rate caused by skew between signals or the like can be estimated from the signal-to-noise ratio.

Moreover, if the apparatus is constructed such that a cross-correlation coefficient ρ between clocks each having a different frequency from one another can be measured in addition to a cross-correlation coefficient p between clocks having the same frequency, a quality measure of a clock in a different clock domain that will become important hereinafter can also be measured.

What is claimed is:

1. An apparatus for measuring the cross-correlation coefficient between a first and a second signals under measurement comprising:
   a first timing jitter estimator for estimating a timing jitter sequence of the first signal under measurement as a first timing jitter sequence;
   a second timing jitter estimator for estimating a timing jitter sequence of the second signal under measurement as a second timing jitter sequence; and
   a cross-correlation coefficient estimator to which the first timing jitter sequence and the second timing jitter sequence are inputted for calculating the cross-correlation coefficient between the first and the second signals under measurement.

2. The apparatus for measuring the cross-correlation coefficient between a first and a second signals under measurement according to claim 1 further including a signal-to-noise ratio estimator to which the cross-correlation coefficient is inputted for calculating the signal-to-noise ratio between the first and the second signals under measurement.

3. The apparatus for measuring the cross-correlation coefficient between a first and a second signals under measurement according to claim 1 wherein said cross-correlation coefficient estimator comprises:
   a first RMS value estimator to which the first timing jitter sequence is inputted for obtaining its root-mean-square value;
   a second RMS value estimator to which the second timing jitter sequence is inputted for obtaining its root-mean-square value;

a covariance estimator to which the first timing jitter sequence and the second timing jitter sequence are inputted for obtaining the covariance between those jitter sequences; and a multiplier/divider to which the root-mean-square value of the first timing jitter sequence, the root-mean-square value of the second timing jitter sequence, and the covariance value are inputted for calculating the cross-correlation coefficient between the first and the second signals under measurement.

4. The apparatus for measuring the cross-correlation coefficient between a first and a second signals under measurement according to claim 1 further including;

a skew estimator to which the first timing jitter sequence and the second timing jitter sequence are inputted for calculating a timing difference sequence between those timing jitter sequences to output a skew sequence;

wherein said cross-correlation coefficient estimator is an estimator to which the first timing jitter sequence, the second timing jitter sequence, and the skew sequence are inputted for calculating the cross-correlation coefficient.

5. The apparatus for measuring the cross-correlation coefficient between a first and a second signals under measurement according to claim 4 wherein said cross-correlation coefficient estimator comprises:

a first, a second, and a third RMS estimators to which the first timing jitter sequence, the second timing jitter sequence, and the skew sequence are inputted, respectively for obtaining respective root-mean-square values;

a multiplier/divider/adder/subtractor to which the root-mean-square value of the first timing jitter sequence, the root-mean-square value of the second timing jitter sequence, and the root-mean-square value of the skew sequence are inputted for calculating the cross-correlation coefficient from those root-mean-square values.

6. The apparatus for measuring the cross-correlation coefficient between a first and a second signals under measurement according to claim 3 further including a frequency multiplier to which the first timing jitter sequence is inputted for creating a timing jitter sequence of a signal whose frequency is equal to multiple of a frequency of the first signal under measurement to output the created timing jitter sequence to said skew estimator.

7. The apparatus for measuring the cross-correlation coefficient between a first and a second signals under measurement according to any one of claims 1–6 wherein said timing jitter estimator comprises:

an analytic signal transformer for transforming a signal under measurement into a complex analytic signal;

an instantaneous phase estimator for obtaining an instantaneous phase of the analytic signal;

a continuous phase converter for converting the instantaneous phase into a continuous instantaneous phase;

a linear phase estimator for estimating, from the continuous instantaneous phase, its linear instantaneous phase;

a subtractor for removing the linear instantaneous phase from the continuous instantaneous phase to obtain an instantaneous phase noise; and a zero-crossing sampler for sampling its input at a timing close to a zero-crossing timing of a real part of the analytic signal to output the sampled signal, said zero-crossing sampler being inserted in series to any one of connection points between said instantaneous phase estimator and said continuous phase converter, between said continuous phase converter and said linear phase estimator/said subtractor, and at an output side of said subtractor;

wherein a timing jitter sequence of the clock signal under measurement is outputted as an output of said jitter sequence estimation part.

8. The apparatus for measuring the cross-correlation coefficient between a first and a second signals under measurement according to claim 7 wherein said analytic signal transformer can change a pass bandwidth of the signal under measurement.

9. The apparatus for measuring the cross-correlation coefficient between a first and a second signals under measurement according to claim 7 wherein said timing jitter estimator includes a low frequency component remover to which the instantaneous phase noise is inputted for removing low frequency components of the instantaneous phase noise to output the instantaneous phase noise from which the low frequency components have been removed.

10. The apparatus for measuring the cross-correlation coefficient between a first and a second signals under measurement according to any one of claims 1–6 further including:

a waveform clipper to which the signal under measurement is inputted for removing amplitude modulation components of the clock signal under measurement in the state that phase modulation components are retained in the signal under measurement to output the clock signal under measurement from which the amplitude modulation components have been removed to said timing jitter estimator.

11. The method of measuring the cross-correlation coefficient between a first and a second signals under measurement comprising:

a step of estimating a timing jitter sequence of the first signal under measurement as a first timing jitter sequence;

a step of estimating a timing jitter sequence of the second signal under measurement as a second timing jitter sequence; and a cross-correlation coefficient estimation step for calculating the cross-correlation coefficient between the first and the second signals under measurement from the first timing jitter sequence and the second timing jitter sequence.

12. The method of measuring the cross-correlation coefficient between a first and a second signals under measurement according to claim 11 wherein said cross-correlation coefficient estimation step comprises:

a step of obtaining a root-mean-square value of the first timing jitter sequence;

a step of obtaining a root-mean-square value of the second timing jitter sequence;

a step of obtaining the covariance between the first timing jitter sequence and the second timing jitter sequence; and a step of multiplying and dividing the root-mean-square value of the first timing jitter sequence, the root-mean-square value of the second timing jitter sequence, and the covariance value to calculate the cross-correlation coefficient.

13. The method of measuring the cross-correlation coefficient between a first and a second signals under measurement according to claim 11 further including a step of calculating the signal-to-noise ratio between the first and the second signals under measurement.

14. The method of measuring the cross-correlation coefficient between a first and a second signals under measurement according to claim 11 further including;
   a step of calculating a timing difference sequence between the first timing jitter sequence and the second timing jitter sequence to obtain a skew sequence;
   wherein said cross-correlation coefficient estimation step is a step of calculating the cross-correlation coefficient involving the skew sequence.

15. The method of measuring the cross-correlation coefficient between a first and a second signals under measurement according to claim 14 wherein said cross-correlation coefficient estimation step comprises:
   a step of calculating a root-mean-square value of the first timing jitter sequence;
   a step of calculating a root-mean-square value of the second timing jitter sequence; and
   a step of calculating a root-mean-square value of the skew sequence; and
   a step of multiplying, dividing, adding, and subtracting the root-mean-square value of the first timing jitter sequence, the root-mean-square value of the second timing jitter sequence, and the root-mean-square value of the skew sequence to calculate the cross-correlation coefficient.

16. The method of measuring the cross-correlation coefficient between a first and a second signals under measurement according to claim 13 further including a step of copying the first timing jitter sequence to estimate a timing jitter sequence of a signal created by multiplying a frequency of the first signal under measurement;
   wherein said step of estimating a skew is a step of creating a skew sequence using the timing jitter sequence created by multiplying the frequency of the first signal under measurement and the second timing jitter sequence.

17. The method of measuring the cross-correlation coefficient between a first and a second signals under measurement according to any one of claims 11–16 wherein said step of estimating a timing jitter sequence comprises:
   a step of transforming a clock signal under measurement into a complex analytic signal;
   a step of obtaining an instantaneous phase of the signal under measurement from the analytic signal;
   a step of converting the instantaneous phase into a continuous instantaneous phase;
   a step of estimating, from the continuous instantaneous phase, its linear instantaneous phase;
   a step of removing the linear instantaneous phase from the continuous instantaneous phase to obtain an instantaneous phase noise; and
   a step of sampling any one of the instantaneous phase, the continuous instantaneous phase, and the phase noise waveform at a timing close to a zero-crossing timing of a real part of the analytic signal;
   wherein a timing jitter sequence of the signal under measurement is eventually obtained.

18. The method of measuring the cross-correlation coefficient between a first and a second signals under measurement according to claim 17 wherein said step of estimating a timing jitter sequence includes a step of removing low frequency components of the instantaneous phase noise.

19. The method of measuring the cross-correlation coefficient between a first and a second signals under measurement according to any one of claims 11–16 further including:
   a step of performing a waveform clipping, in the state that phase modulation components are retained in the signal under measurement, to remove amplitude modulation components of the signal under measurement, and moving to said step of estimating a timing jitter sequence.

* * * * *